(12) United States Patent
Barber et al.

(10) Patent No.: US 7,817,878 B2
(45) Date of Patent: Oct. 19, 2010

(54) IMAGING APPARATUS HAVING PLURALITY OF OPERATING STATES

(75) Inventors: Charles P. Barber, Fayetteville, NY (US); Carl W. Gerst, III, Clifton Park, NY (US); George S. Smith, II, Skaneateles, NY (US); Robert M. Hussey, Camillus, NY (US); Robert C. Gardiner, Fayetteville, NY (US); Matthew W. Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 12/371,277

(22) Filed: Feb. 13, 2009
(Under 37 CFR 1.47)

(65) Prior Publication Data

US 2009/0255993 A1    Oct. 15, 2009

Related U.S. Application Data

(62) Division of application No. 11/895,803, filed on Aug. 27, 2007, now Pat. No. 7,492,493, which is a division of application No. 09/766,922, filed on Jan. 22, 2001, now Pat. No. 7,268,924.

(51) Int. Cl.
| H04N 1/04 | (2006.01) |
| H04N 1/024 | (2006.01) |
| G06K 7/10 | (2006.01) |
| G06K 9/22 | (2006.01) |

(52) U.S. Cl. .............. 382/313; 358/484; 358/474; 235/462.45; 235/462.09; 235/462.1; 235/462.11; 235/462.12; 235/462.25

(58) Field of Classification Search ............ 235/462.01, 235/462.09, 462.1, 462.11, 462.12, 462.02, 235/462.45, 462.25; 358/474, 443, 448, 358/471, 482, 484; 382/312, 313, 314, 321
See application file for complete search history.

(56) References Cited

U.S. PATENT DOCUMENTS 3,582,884 A    6/1971    Shepard (Continued)

FOREIGN PATENT DOCUMENTS

EP    0364676 A2    4/1990

(Continued)

OTHER PUBLICATIONS

A CompactFlash interface is an interface designed in accordance with the CompactFlash standard as described in the CompactFlash Specification version 2.0 maintained at the website http://www.compactflash.org. pp. 1-2, 2003.

(Continued)

*Primary Examiner*—Jerome Grant, II
(74) *Attorney, Agent, or Firm*—Marjama Muldoon Blasiak & Sullivan LLP

(57) ABSTRACT

There is described an imaging apparatus having an image sensor, and a plurality of operating states. Operation of the imaging apparatus can be differentiated between the operating states. In one operating state, the imaging apparatus can capture a frame of image data having image data corresponding to a predetermined number of pixels of the image sensor. The operating states of the imaging apparatus can be user selectable.

10 Claims, 11 Drawing Sheets

U.S. PATENT DOCUMENTS

| | | |
|---|---|---|
| 3,663,762 A | 5/1972 | Joel, Jr. |
| 3,684,868 A | 8/1972 | Christie et al. |
| 3,723,970 A | 3/1973 | Stoller |
| 3,906,166 A | 9/1975 | Cooper et al. |
| 4,004,237 A | 1/1977 | Kratzer |
| 4,041,391 A | 8/1977 | Deerkoski |
| 4,097,847 A | 6/1978 | Forsen et al. |
| 4,114,155 A | 9/1978 | Raab |
| 4,164,628 A | 8/1979 | Ward et al. |
| 4,210,802 A | 7/1980 | Sakai et al. |
| 4,291,410 A | 9/1981 | Caples et al. |
| 4,315,245 A | 2/1982 | Nakahara et al. |
| 4,435,822 A | 3/1984 | Spencer et al. |
| 4,445,118 A | 4/1984 | Taylor et al. |
| 4,488,678 A | 12/1984 | Hara et al. |
| 4,488,679 A | 12/1984 | Bockholt et al. |
| 4,500,776 A | 2/1985 | Laser |
| 4,538,060 A | 8/1985 | Sakai et al. |
| 4,542,528 A | 9/1985 | Sanner et al. |
| 4,561,089 A | 12/1985 | Rouse et al. |
| 4,610,359 A | 9/1986 | Muller et al. |
| 4,628,532 A | 12/1986 | Stone et al. |
| 4,636,624 A | 1/1987 | Ishida et al. |
| 4,639,932 A | 1/1987 | Schiff |
| 4,644,523 A | 2/1987 | Horwitz |
| 4,646,353 A | 2/1987 | Tenge et al. |
| 4,653,076 A | 3/1987 | Jerrim et al. |
| 4,686,363 A | 8/1987 | Schoon |
| 4,690,530 A | 9/1987 | Fujino et al. |
| 4,710,817 A | 12/1987 | Ando et al. |
| 4,757,057 A | 7/1988 | Fussi et al. |
| 4,785,463 A | 11/1988 | Janc et al. |
| 4,791,446 A | 12/1988 | Ishida et al. |
| 4,794,239 A | 12/1988 | Allais |
| 4,807,256 A | 2/1989 | Holmes et al. |
| 4,818,856 A | 4/1989 | Matsushima et al. |
| 4,841,544 A | 6/1989 | Nuytkens |
| 4,877,949 A | 10/1989 | Danielson et al. |
| 4,901,073 A | 2/1990 | Kibrick |
| 4,908,500 A | 3/1990 | Baumberger et al. |
| 4,933,538 A | 6/1990 | Heiman et al. |
| 4,942,474 A | 7/1990 | Akimoto et al. |
| 5,019,699 A | 5/1991 | Koenck |
| 5,113,445 A | 5/1992 | Wang |
| 5,138,140 A | 8/1992 | Siemiatkowski et al. |
| 5,153,421 A | 10/1992 | Tandon et al. |
| 5,212,777 A | 5/1993 | Gove et al. |
| 5,229,591 A | 7/1993 | Heiman et al. |
| 5,235,167 A | 8/1993 | Dvorkis et al. |
| 5,245,695 A | 9/1993 | Basehore |
| 5,250,791 A | 10/1993 | Heiman et al. |
| 5,262,871 A | 11/1993 | Wilder et al. |
| 5,268,758 A | 12/1993 | Nakayama et al. |
| 5,280,547 A | 1/1994 | Mahoney |
| 5,286,960 A | 2/1994 | Longacre, Jr. et al. |
| 5,294,783 A | 3/1994 | Hammond, Jr. et al. |
| 5,304,787 A | 4/1994 | Wang |
| 5,311,001 A | 5/1994 | Joseph et al. |
| 5,319,185 A | 6/1994 | Obata et al. |
| 5,331,176 A | 7/1994 | Sant' Anselmo et al. |
| 5,343,028 A | 8/1994 | Figarella et al. |
| 5,343,787 A | 9/1994 | McDonnell |
| 5,345,266 A | 9/1994 | Denyer et al. |
| 5,354,977 A | 10/1994 | Roustaei |
| 5,378,883 A | 1/1995 | Batterman et al. |
| 5,392,447 A | 2/1995 | Schlack et al. |
| 5,396,053 A | 3/1995 | Swartz et al. |
| 5,396,054 A | 3/1995 | Krichever et al. |
| 5,401,949 A | 3/1995 | Ziemacki et al. |
| 5,414,251 A | 5/1995 | Durbin |
| 5,418,357 A | 5/1995 | Inoue et al. |
| 5,420,409 A | 5/1995 | Longacre, Jr. et al. |
| 5,430,286 A | 7/1995 | Hammond, Jr. et al. |
| 5,446,271 A | 8/1995 | Cherry et al. |
| 5,461,425 A | 10/1995 | Fowler et al. |
| 5,463,214 A | 10/1995 | Longacre, Jr. et al. |
| 5,471,515 A | 11/1995 | Fossum et al. |
| 5,471,592 A | 11/1995 | Gove et al. |
| 5,477,042 A | 12/1995 | Wang |
| 5,478,997 A | 12/1995 | Bridgelall et al. |
| 5,504,524 A | 4/1996 | Lu et al. |
| 5,506,880 A | 4/1996 | Scardino et al. |
| 5,512,739 A | 4/1996 | Chandler et al. |
| 5,521,366 A | 5/1996 | Wang et al. |
| 5,524,068 A | 6/1996 | Kacandes et al. |
| 5,525,788 A | 6/1996 | Bridgelall et al. |
| 5,537,431 A | 7/1996 | Chen et al. |
| 5,545,886 A | 8/1996 | Metlitsky et al. |
| 5,561,283 A | 10/1996 | Dvorkis et al. |
| 5,569,901 A | 10/1996 | Bridgelall et al. |
| 5,572,006 A | 11/1996 | Wang et al. |
| 5,585,616 A | 12/1996 | Roxby et al. |
| 5,591,956 A | 1/1997 | Longacre, Jr. et al. |
| 5,598,007 A | 1/1997 | Bunce et al. |
| 5,600,119 A | 2/1997 | Dvorkis et al. |
| 5,610,387 A | 3/1997 | Bard et al. |
| 5,619,597 A | 4/1997 | Moreton |
| 5,621,203 A | 4/1997 | Swartz et al. |
| 5,640,202 A | 6/1997 | Kondo et al. |
| 5,657,395 A | 8/1997 | Hirota et al. |
| 5,663,549 A | 9/1997 | Katz et al. |
| 5,665,954 A | 9/1997 | Bard et al. |
| 5,665,959 A | 9/1997 | Fossum et al. |
| 5,668,803 A | 9/1997 | Tymes et al. |
| 5,672,858 A | 9/1997 | Li et al. |
| 5,692,062 A | 11/1997 | Lareau et al. |
| 5,703,349 A | 12/1997 | Meyerson et al. |
| 5,710,417 A | 1/1998 | Joseph et al. |
| 5,717,602 A | 2/1998 | Kenning |
| 5,723,823 A | 3/1998 | Bell |
| 5,723,853 A | 3/1998 | Longacre, Jr. et al. |
| 5,723,868 A | 3/1998 | Hammond, Jr. et al. |
| 5,739,518 A | 4/1998 | Wang |
| 5,756,981 A | 5/1998 | Roustaei et al. |
| 5,773,806 A | 6/1998 | Longacre, Jr. |
| 5,773,810 A | 6/1998 | Hussey et al. |
| 5,774,357 A | 6/1998 | Hoffberg et al. |
| 5,780,834 A | 7/1998 | Havens et al. |
| 5,784,102 A | 7/1998 | Hussey et al. |
| 5,811,785 A | 9/1998 | Heiman et al. |
| 5,814,803 A | 9/1998 | Olmstead et al. |
| 5,818,528 A | 10/1998 | Roth et al. |
| 5,821,523 A | 10/1998 | Bunte et al. |
| 5,825,006 A | 10/1998 | Longacre, Jr. et al. |
| 5,831,254 A | 11/1998 | Karpen et al. |
| 5,831,674 A | 11/1998 | Ju et al. |
| 5,841,121 A | 11/1998 | Koenck |
| 5,841,126 A | 11/1998 | Fossum et al. |
| 5,866,894 A | 2/1999 | Bard et al. |
| 5,875,108 A | 2/1999 | Hoffberg et al. |
| 5,877,487 A | 3/1999 | Tani et al. |
| 5,900,613 A | 5/1999 | Koziol et al. |
| 5,902,988 A | 5/1999 | Durbin |
| 5,917,171 A | 6/1999 | Sasai et al. |
| 5,920,477 A | 7/1999 | Hoffberg et al. |
| 5,926,214 A | 7/1999 | Denyer et al. |
| 5,929,418 A | 7/1999 | Ehrhart et al. |
| 5,932,862 A | 8/1999 | Hussey et al. |
| 5,942,741 A | 8/1999 | Longacre, Jr. et al. |
| 5,949,052 A | 9/1999 | Longacre, Jr. et al. |
| 5,949,054 A | 9/1999 | Karpen et al. |
| 5,949,056 A | 9/1999 | White |
| 5,965,863 A | 10/1999 | Parker et al. |
| 5,969,753 A | 10/1999 | Robinson et al. |

| | | | | | | |
|---|---|---|---|---|---|---|
| 5,979,768 | A | 11/1999 | Koenck | 6,739,511 B2 | 5/2004 | Tsikos et al. |
| 5,984,186 | A | 11/1999 | Tafoya | 6,742,707 B1 | 6/2004 | Tsikos et al. |
| 5,986,297 | A | 11/1999 | Guidash et al. | 6,801,572 B2 * | 10/2004 | Yamada et al. ......... 375/240.03 |
| 5,996,895 | A | 12/1999 | Heiman et al. | 6,832,729 B1 | 12/2004 | Perry et al. |
| 6,003,008 | A | 12/1999 | Postrel et al. | 6,837,432 B2 | 1/2005 | Tsikos et al. |
| 6,017,496 | A | 1/2000 | Nova et al. | 6,854,649 B2 | 2/2005 | Worner et al. |
| 6,019,286 | A | 2/2000 | Li et al. | 6,857,570 B2 | 2/2005 | Tsikos et al. |
| 6,044,180 | A | 3/2000 | Brandestini et al. | 6,858,159 B2 | 2/2005 | Lyons |
| 6,047,085 | A | 4/2000 | Sato et al. | 6,860,428 B1 | 3/2005 | Dowling et al. |
| 6,119,179 | A | 9/2000 | Whitridge et al. | 6,863,216 B2 | 3/2005 | Tsikos at al. |
| 6,123,264 | A | 9/2000 | Li et al. | 6,972,791 B1 | 12/2005 | Yomeyama et al. |
| 6,141,046 | A | 10/2000 | Roth et al. | 7,124,948 B2 | 10/2006 | Longacre, Jr. et al. |
| 6,144,453 | A | 11/2000 | Hallerman et al. | 7,178,733 B2 | 2/2007 | Zhu at al. |
| 6,155,488 | A | 12/2000 | Olmstead et al. | 7,219,841 B2 | 5/2007 | Biss et al. |
| 6,155,491 | A | 12/2000 | Dueker et al. | 7,268,924 B2 | 9/2007 | Hussey et al. |
| 6,161,760 | A | 12/2000 | Marrs et al. | 7,270,273 B2 | 9/2007 | Barber et al. |
| 6,164,545 | A | 12/2000 | Danielson | 7,275,694 B2 | 10/2007 | Longacre, Jr. |
| 6,170,749 | B1 | 1/2001 | Goren et al. | 7,428,079 B2 | 9/2008 | Barber et al. |
| 6,175,357 | B1 | 1/2001 | Gordon | 7,446,753 B2 | 11/2008 | Fitch et al. |
| 6,176,429 | B1 | 1/2001 | Reddersen et al. | 2002/0125317 A1 | 9/2002 | Hussey et al. |
| 6,177,999 | B1 | 1/2001 | Wurz et al. | 2002/0135683 A1 | 9/2002 | Tamama et al. |
| 6,179,208 | B1 | 1/2001 | Feng | 2002/0158127 A1 | 10/2002 | Hori et al. |
| 6,186,404 | B1 | 2/2001 | Ehrhart et al. | 2002/0186195 A1 | 12/2002 | Janssen et al. |
| 6,215,992 | B1 | 4/2001 | Howell et al. | 2003/0062418 A1 | 4/2003 | Barber et al. |
| 6,219,182 | B1 | 4/2001 | McKinley | 2004/0195328 A1 | 10/2004 | Barber et al. |
| 6,229,921 | B1 | 5/2001 | Wenzel et al. | 2004/0256465 A1 | 12/2004 | Longacre |
| 6,233,011 | B1 | 5/2001 | Su et al. | 2004/0262391 A1 | 12/2004 | Harris et al. |
| 6,240,218 | B1 | 5/2001 | Michael et al. | 2004/0262392 A1 | 12/2004 | Longacre et al. |
| 6,246,779 | B1 | 6/2001 | Fukui et al. | 2005/0056699 A1 | 3/2005 | Meier et al. |
| 6,257,490 | B1 | 7/2001 | Tafoya | 2005/0103851 A1 | 5/2005 | Zhu et al. |
| 6,264,105 | B1 | 7/2001 | Longacre, Jr. et al. | 2006/0054704 A1 | 3/2006 | Fitch et al. |
| 6,267,501 | B1 | 7/2001 | Wand et al. | 2006/0097054 A1 | 5/2006 | Biss et al. |
| 6,268,848 | B1 | 7/2001 | Eglit | 2006/0126129 A1 | 6/2006 | Barber et al. |
| 6,268,883 | B1 | 7/2001 | Zehnder et al. | 2006/0203092 A1 | 9/2006 | Nobori et al. |
| 6,268,918 | B1 | 7/2001 | Tanabe et al. | 2007/0012777 A1 | 1/2007 | Tsikos et al. |
| 6,276,605 | B1 | 8/2001 | Olmstead et al. | 2007/0040035 A1 | 2/2007 | Kotlarsky et al. |
| 6,326,230 | B1 | 12/2001 | Pain et al. | 2008/0170275 A1 | 7/2008 | Barber et al. |
| 6,329,139 | B1 | 12/2001 | Nova et al. | 2009/0032597 A1 | 2/2009 | Barber et al. |
| 6,330,975 | B1 | 12/2001 | Bunte et al. | | | |
| 6,347,163 | B2 | 2/2002 | Roustaei | | | |
| 6,348,773 | B1 | 2/2002 | Dvorkis et al. | | | |
| 6,360,948 | B1 | 3/2002 | Yang et al. | | FOREIGN PATENT DOCUMENTS | |
| 6,385,352 | B1 | 5/2002 | Roustaei | | | |
| 6,398,112 | B1 | 6/2002 | Li et al. | EP | 0449634 A2 | 10/1991 |
| 6,429,934 | B1 | 8/2002 | Dunn et al. | EP | 0653720 A2 | 5/1995 |
| 6,462,842 | B1 | 10/2002 | Hamilton | EP | 0690403 A2 | 1/1996 |
| 6,486,911 | B1 | 11/2002 | Denyer et al. | EP | 0722148 A2 | 7/1996 |
| 6,491,223 | B1 | 12/2002 | Longacre, Jr. et al. | JP | 5376047 | 6/1978 |
| 6,493,029 | B1 | 12/2002 | Denyer et al. | JP | 62162181 | 7/1987 |
| 6,505,778 | B1 | 1/2003 | Reddersen et al. | JP | 02144786 | 6/1990 |
| 6,512,218 | B1 | 1/2003 | Canini et al. | JP | 8171604 | 7/1996 |
| 6,518,559 | B2 | 2/2003 | Endo et al. | JP | 08235298 | 9/1996 |
| 6,525,827 | B2 | 2/2003 | Liu | JP | 09034982 | 2/1997 |
| 6,547,139 | B1 | 4/2003 | Havens et al. | JP | 10198754 | 7/1998 |
| 6,547,142 | B1 | 4/2003 | Goren et al. | JP | 11184961 | 7/1999 |
| 6,552,323 | B2 | 4/2003 | Guidash et al. | JP | 2000092317 | 3/2000 |
| 6,552,746 | B1 | 4/2003 | Yang et al. | JP | 2000215268 | 8/2000 |
| 6,585,159 | B1 | 7/2003 | Meier et al. | JP | 2000242826 | 9/2000 |
| 6,598,797 | B2 | 7/2003 | Lee | JP | 2000295612 * | 10/2000 |
| 6,606,171 | B1 | 8/2003 | Renk et al. | JP | 2000353210 | 12/2000 |
| 6,634,558 | B1 | 10/2003 | Patel et al. | JP | 2004533031 | 10/2004 |
| 6,637,658 | B2 | 10/2003 | Gardiner et al. | WO | WO-9304442 | 3/1993 |
| 6,655,595 | B1 | 12/2003 | Longacre, Jr. et al. | WO | WO-9314458 | 7/1993 |
| 6,661,521 | B1 | 12/2003 | Stern | WO | WO-9317397 | 9/1993 |
| 6,665,012 | B1 | 12/2003 | Yang et al. | WO | WO-9318478 | 9/1993 |
| 6,690,738 | B1 * | 2/2004 | Swenson et al. ............ 375/265 | WO | WO-9532580 | 11/1995 |
| 6,714,239 | B2 | 3/2004 | Guidash | WO | WO-9708647 | 3/1997 |
| 6,714,665 | B1 | 3/2004 | Hanna et al. | WO | WO-9922335 A1 | 5/1999 |
| 6,722,569 | B2 | 4/2004 | Ehrhart et al. | WO | WO-0016401 | 3/2000 |
| 6,729,546 | B2 | 5/2004 | Roustaei | WO | WO-0126036 A2 | 4/2001 |
| 6,732,929 | B2 | 5/2004 | Good et al. | | | |
| 6,732,930 | B2 | 5/2004 | Massieu et al. | | | |
| 6,736,321 | B2 | 5/2004 | Tsikos et al. | | | |

WO WO-02063543 A2 8/2002

OTHER PUBLICATIONS

Auto focus systems and algorithms are described in more detail on the webpage maintained at the address http://www.cs.mtu.edu/~shene/DigiCam/User-Guide/5700/AUTO-FOCUS/Auto-Focus.html. pp. 1-4, 2004.
Claim set of U.S. Appl. No. 11/637,231, filed Dec. 11, 2006 (1 pg.).
Claims 1-4 as of Mar. 6, 2006, Application No. 02 723 063.0, Publication No. EP1354291 A2, Publication date Oct. 22, 2003.
Claims 1-4 as of Mar. 6, 2006, Application No. 02 723 063.0, Publication No. EP1354291 A2, Publication date Oct. 22, 2003.
Claims of U.S. Appl. No. 12/249,742, filed Oct. 10, 2008 (2 pages).
"Device Performance Specification—Kodak KAC-9630 CMOS Image Sensor," Sep. 2004, revision 1.1. Http://www.kodak.com/global/plugins/acrobat/en/digital/ccd/products/cmos/KAC-9630LongSpec.pdf. pp. 1-22.
"Dual Slope Dynamic Range Expansion" from FillFactory NV, Schaliënhoevedreef 20B, B-2800 Mechelen, Belgium. Http://www.fillfactory.com/htm/technology/htm/dual-slope.htm, pp. 1-2, 2000.
El Gamal, Professor A., Lecture Notes 1, 2, 4, 5, 6, 7, 10 and Handout #3 and #28, "Image Sensors and Digital Cameras" for EE 392B, Spring 2001.
EP Application No. 02 723 063.0-2210, Communication Pursuant to Article 96(2) and Rule 51(2) EPC dated Apr. 27, 2004.
EP Application No. 02 723 063.0-2210, Communication Pursuant to Article 96(2) EPC dated Dec. 11, 2003.
EP Application No. 02723063.0-2210, Summons to Attend Oral Proceeding, dated Jul. 1, 2005, received from Foreign Associate Jul. 5, 2005.
European Office Action for European Patent Application No. 06 015 349.1, Dated Jan. 25, 2008, 3 pages.
European Patent Office, Office Action dated Feb. 14, 2006, Application No. 02 723 063.0, Publication No. EP1354291 A2, Publication date Oct. 22, 2003, 9 pages.
European Search Report for European Patent Application No. 06 015 349.1 dated Sep. 26, 2006 (6 pgs.).
Fossum, Eric R., CMOS Active Pixel Image Sensors, Nuclear Instruments and Methods in Physics Research A 395 (1997) 291-297, Dec. 1997.
Jakl, Edward A., "Why CMOS Image Sensors are Poised to Surpass CCDs," International IC '99, Conference Proceedings, pp. 64-71, Dec. 1997.
Japanese Office Action for Japanese Patent Application No. 2002-563413, Dated Mar. 4, 2008, 4 pages (accompanied by full text English translation thereof, 6 pages).
Japanese Office Action for Japanese Patent Application No. 2002-563413, Dated Mar. 4, 2008, 4 pages (accompanied by full text English translation thereof, 6 pages, also accompanied by English translation of claims 1-47).
Marshall Electronics, Optical Systems Division, Monochrome Monolithic Image Sensor With Analogue and Digital Outputs VVL1070 Specification, Believed to be published in 1994, pp. 1-24, Dec. 1994.
Micron's Wide VGA MT9V022 image sensor from Micron Technology, Inc., 8009 South Federal Way, Post Office Box 6, Boise, ID 83707-0006. http://download.micron.com/pdf/flyers/mt9v022_(mi-0350)_flyer.pdf. pp. 1-2, Dec. 2004.
PC Card Standard 8.0 Release—Apr. 2001 maintained by the Personal Computer Memory Card International Association (PCMCIA) and available through the website at http://www.pcmcia.org. pp. 1-2.
Pending claims as of Mar. 24, 2006, U.S. Appl. No. 10/651,298, filed Aug. 28, 2003, 6 pages.
Sony Corporation, ICX084AL, Technical Specification, Believed to be published prior to Jan. 22, 2000.
Symbol Technologies, Inc., LS 4800 Series Product Reference Guide, May 1996, Holtsville, NY.
Tian, Hui et al., "Analysis of 1/f Noise in Switched MOSFET Circuits," IEEE Transactions on Circuits and Systems- II Analog and Digital Signal Processing, vol. 48, No. 2, Feb. 2001, pp. 151-157, 7 pp.
U.S. Patent and Trademark Office, Office Action received Feb. 27, 2006, U.S. Appl. No. 10/651,298, filed Aug. 28, 2003, 15 pages.
VLSI Vision Ltd., High Resolution EIA/CCIR Monochrome Monolithic Camera Specification, VVL-1060, Apr. 1994, pp. 1-23.
VLSI Vision Ltd., Serial Interface Specification, VVL-1060, Apr. 1994, pp. 1-9.
VVL1070 Engineering Evaluation Kit Specification, Sep. 27, 1994, V1.1, pp. 1-5.
"LinLog Technology" from Photonfocus AG, Bahnhofplatz 10, CH-8853 Lachen, Switzerland. Http://www.photonfocus.com/html/eng/cmos/linlog.php. pp. 1-5, Dec. 2003.
"Full Specification" Revision 1 dated Aug. 5, 2002. http://www.kodak.com/global/plugins/acrobat/en/digital/ccd/products/cmos/KAC-0311LongSpec.pdf. pp. 1-56.

\* cited by examiner

IMAGING APPARATUS HAVING PLURALITY OF OPERATING STATES

CROSS REFERENCE TO RELATED APPLICATIONS

This application is a divisional application of U.S. patent application Ser. No. 11/895,803, filed Aug. 27, 2007, (U.S. Patent Application Publication No. 2008/0170275, entitled, "Bar Code Reading Device Having Plurality of Operating States" which is incorporated herein by reference in its entirety, which a divisional application of U.S. patent application Ser. No. 09/766,922, filed Jan. 22, 2001, (U.S. Pat. No. 7,268,924) entitled, "Optical Reader Having Reduced Parameter Determination Delay" which is incorporated herein by reference in its entirety. In addition, the present application incorporates by reference in its entirety U.S. patent application Ser. No. 09/766,806 (now U.S. Pat. No. 6,637,658 B2) filed Jan. 22, 2001 entitled, "Optical Reader Having Partial Frame Operating Mode," which application is incorporated by reference in the aforementioned U.S. patent application Ser. No. 09/766,922 filed Jan. 22, 2001. This application is also related to U.S. patent application Ser. No. 11/238,176, filed Sep. 28, 2005, (U.S. Pat. No. 7,428,079) entitled "Bar code reading device having partial frame image capture operating mode," U.S. patent application Ser. No. 10/651,298, filed Aug. 28, 2003, (U.S. Pat. No. 7,270,273) entitled "Optical Reader Having Partial Frame Operating Mode," and U.S. patent application Ser. No. 11/637,231, filed Dec. 11, 2006 (U.S. Pat. No. 7,434,733) entitled "Optical Reader Having Partial Frame Operating Mode," and U.S. patent application Ser. No. 12/249,742, filed Oct. 10, 2008 entitled "Reading Apparatus Having Partial Frame Operating Mode."

FIELD OF THE INVENTION

The present invention relates to a bar code reading device generally and particularly to a bar code reading device having a plurality of operating states.

BACKGROUND OF THE PRIOR ART

Prior to commencing comprehensive image data processing, which may include e.g., searching for symbol or character representations, decoding and character recognition processing, presently available optical readers clock out and capture in a memory location at least one exposure test frame of image data, read pixel data from the memory-stored exposure test frame to determine an exposure parameter value that is based on actual illumination conditions, then utilize the exposure parameter value in the exposure of a frame of image data that is clocked out, and then subjected to searching, decoding, and/or character recognition processing. The frame of image data exposed utilizing the exposure parameter based on actual illumination conditions is not available for reading until after it is clocked out. Presently available optical readers therefore exhibit an appreciable inherent exposure parameter determination delay. Readers having higher resolution imagers have slower frame clock out rates and therefore longer exposure parameter determination delays.

There is a growing demand for higher resolution optical readers, including optical readers that incorporate mega pixel image sensors. Accordingly, there is growing need to address the parameter determination delay problem associated with presently available optical readers.

Optical readers having 2D image sensors commonly are used to read both 1D and 2D symbols. Some optical readers having a 2D image sensor read a 1D symbol by capturing a 2D image representation, or "frame" of image data corresponding to a target area which comprises a 1D symbol, and launching a scan line or lines in order to attempt to decode for 1D symbols which may be represented in the area. Other optical readers having 2D image sensors read 1D symbols by capturing a 2D image representation of an area containing the 1D symbol, preliminarily analyzing the image data represented in the area to determine that the image data comprises a representation of a 1D symbol, and then launching a scan line in an attempt to decode for the 1D symbol determined to be present. In either case, a full frame 2D image representation is captured in order to decode for a 1D symbol.

[Beginning of section excerpted from U.S. patent application Ser. No. 09/766,806].

Figure 5A:
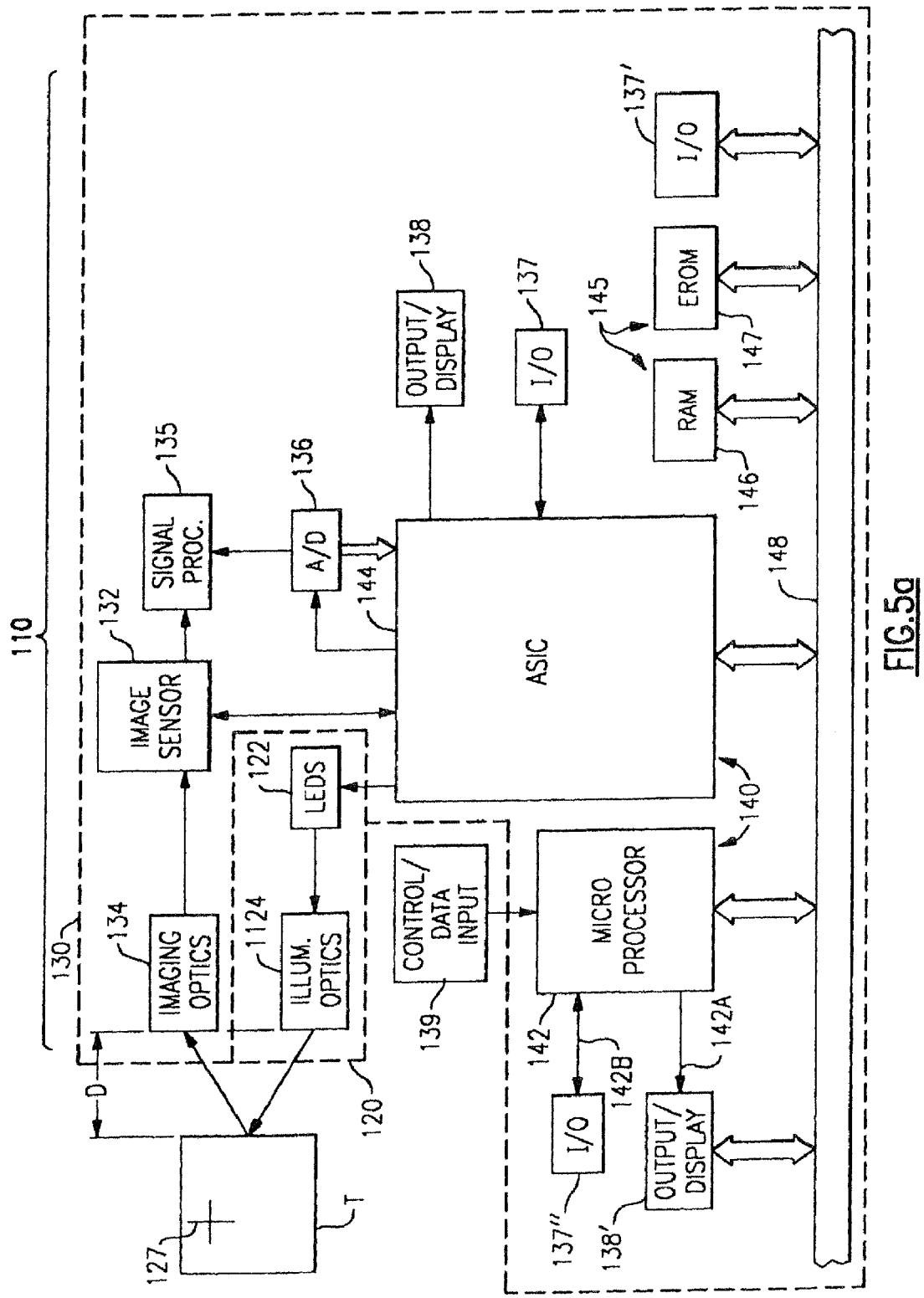
Figure 5B:
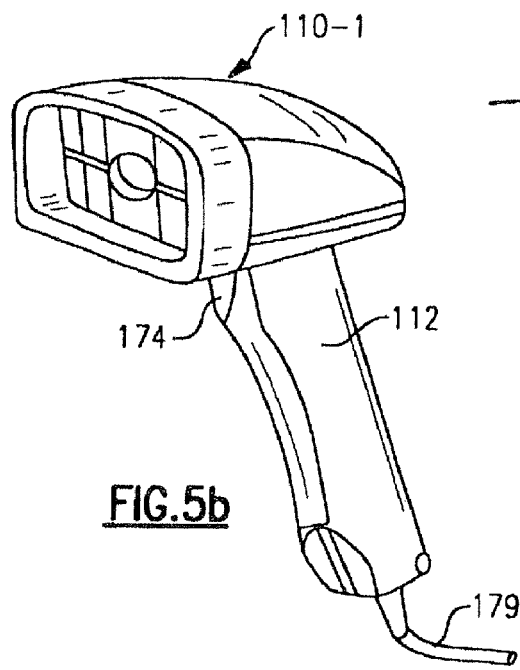
Figure 5C:
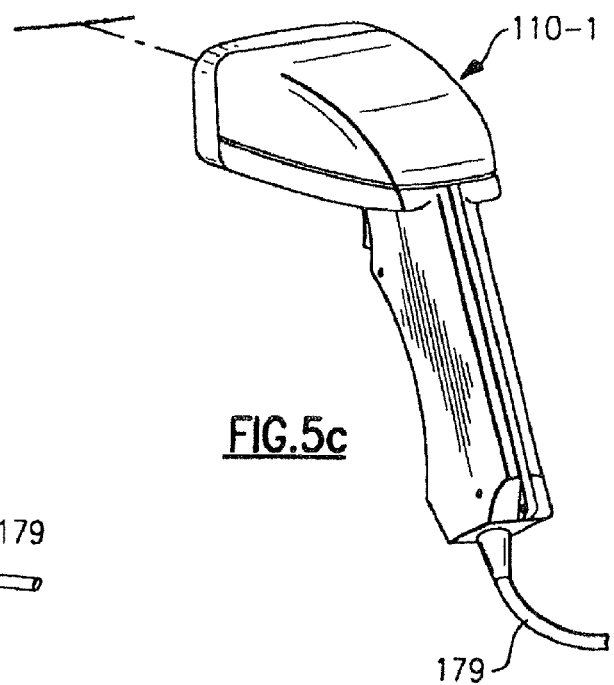
Figure 5D:
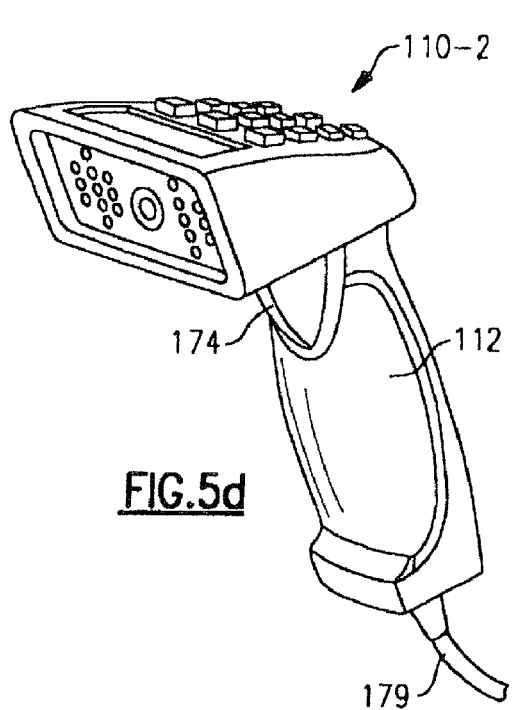
Figure 5E:
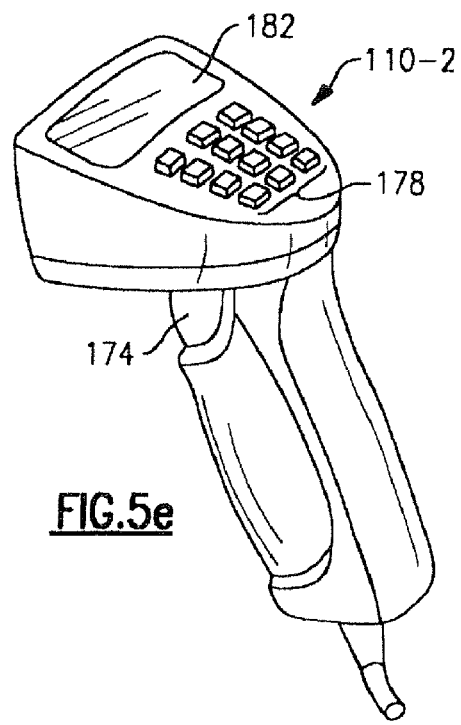
Figure 5F:
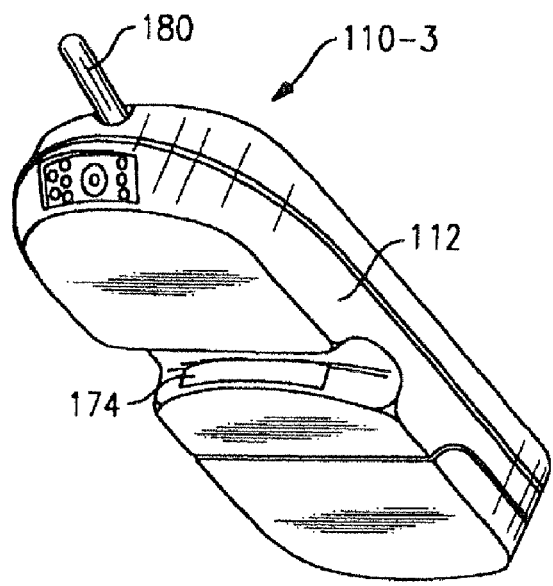
Figure 5G:
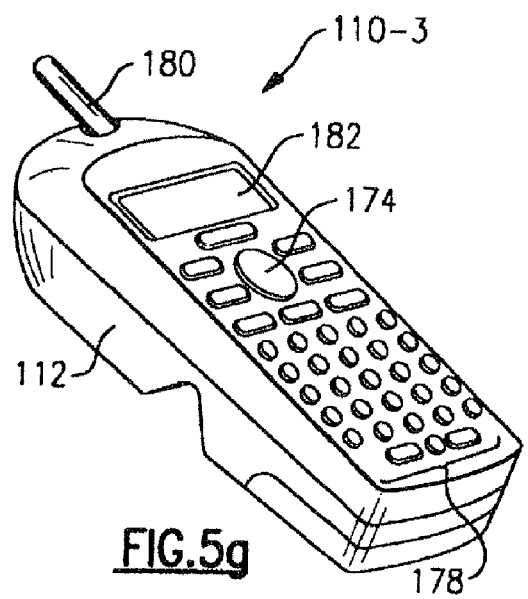

FIGS. 4a-4g illustrate various image data patterns that may be captured by an optical reader operating in a partial frame capture mode according to the invention;

FIG. 5a is a block diagram of an optical reader of a type in which the invention may be incorporated;

FIGS. 5b-5h show various types of optical reader housings in which the invention may be incorporated.

[End of section excerpted from U.S. patent application Ser. No. 09/766,806].

SUMMARY OF THE INVENTION

There is described an imaging apparatus having an image sensor, and a plurality of operating states. Operation of the imaging apparatus can be differentiated between the operating states. In one operating state, the imaging apparatus can capture a frame of image data having image data corresponding to a predetermined number of pixels of the image sensor. The operating states of the imaging apparatus can be user selectable.

DETAILED DESCRIPTION OF THE INVENTION

When operated to generate valid pixel data, presently available optical reading devices clock out electrical signals corresponding to pixel positions of an image sensor at a uniform clock out rate such that the electrical signal corresponding to each pixel of the image sensor array accurately represents light incident on the pixel.

By contrast, an image sensor of the present invention is made to operate under two major frame capture modes, a "low resolution" frame clock out mode and a "normal resolution" frame clock out mode. In a "low resolution" mode of operation, an image sensor according to the invention is operated to clock out electrical signals corresponding to some pixels of an image sensor array at a high clock out rate and other pixels of the image sensor at a normal clock out rate. Clocking out a portion of the electrical signals using a faster than normal clock out rate results in a reduction in the overall frame clock out time while clocking out a portion of the signals at a normal clock out rate enables the generation of pixel data sufficient to enable determination of parameter settings for use in subsequent frame captures. In a "normal resolution" mode of operation the image sensor is operated to clock out electrical signals corresponding to pixels of the array using a single uniform clock out speed as in prior art readers. The low resolution mode of operation may also be carried out by clocking out electrical signals corresponding to only a portion of a frame's pixels and not clocking out electrical signals corresponding to the remaining pixels.

A reader configured in accordance with the invention clocks out and captures in a memory storage location at least one parameter determination frame of image data in a "low resolution" frame capture mode, reads pixels of the parameter determination frame in establishing at least one operation parameter that is based on actual illumination conditions, utilizes the determined operation parameter in clocking out a subsequent frame of image data in a "normal resolution mode," then captures and subjects the frame of image data clocked out utilizing the operation parameter to image data searching, decoding, and/or recognition processing. The reader may be adapted to decode a decodable symbol represented in a frame of image data developed utilizing a determined operating parameter.

An optical reading system is which the invention may be employed is described with reference to the block diagram of FIG. 2a.

Optical reader 10 includes an illumination assembly 20 for illuminating a target object T, such as a 1D or 2D bar code symbol, and an imaging assembly 30 for receiving an image of object T and generating an electrical output signal indicative of the data optically encoded therein. Illumination assembly 20 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 20 may comprise, for example, laser or light emitting diodes (LEDs) such as white LEDs or red LEDs. Illumination assembly 20 may include target illumination and optics for projecting an aiming pattern 27 on target T. Illumination assembly 20 may be eliminated if ambient light levels are certain to be high enough to allow high quality images of object T to be taken. Imaging assembly 30 may include an image sensor 32, such as a 1D or 2D CCD, CMOS, NMOS, PMOS, CID OR CMD solid state image sensor, together with an imaging optics assembly 34 for receiving and focusing an image of object T onto image sensor 32. The array-based imaging assembly shown in FIG. 2a may be replaced by a laser array based imaging assembly comprising multiple laser sources, a scanning mechanism, emit and receive optics, at least one photodetector and accompanying signal processing circuitry.

Figure 2A:
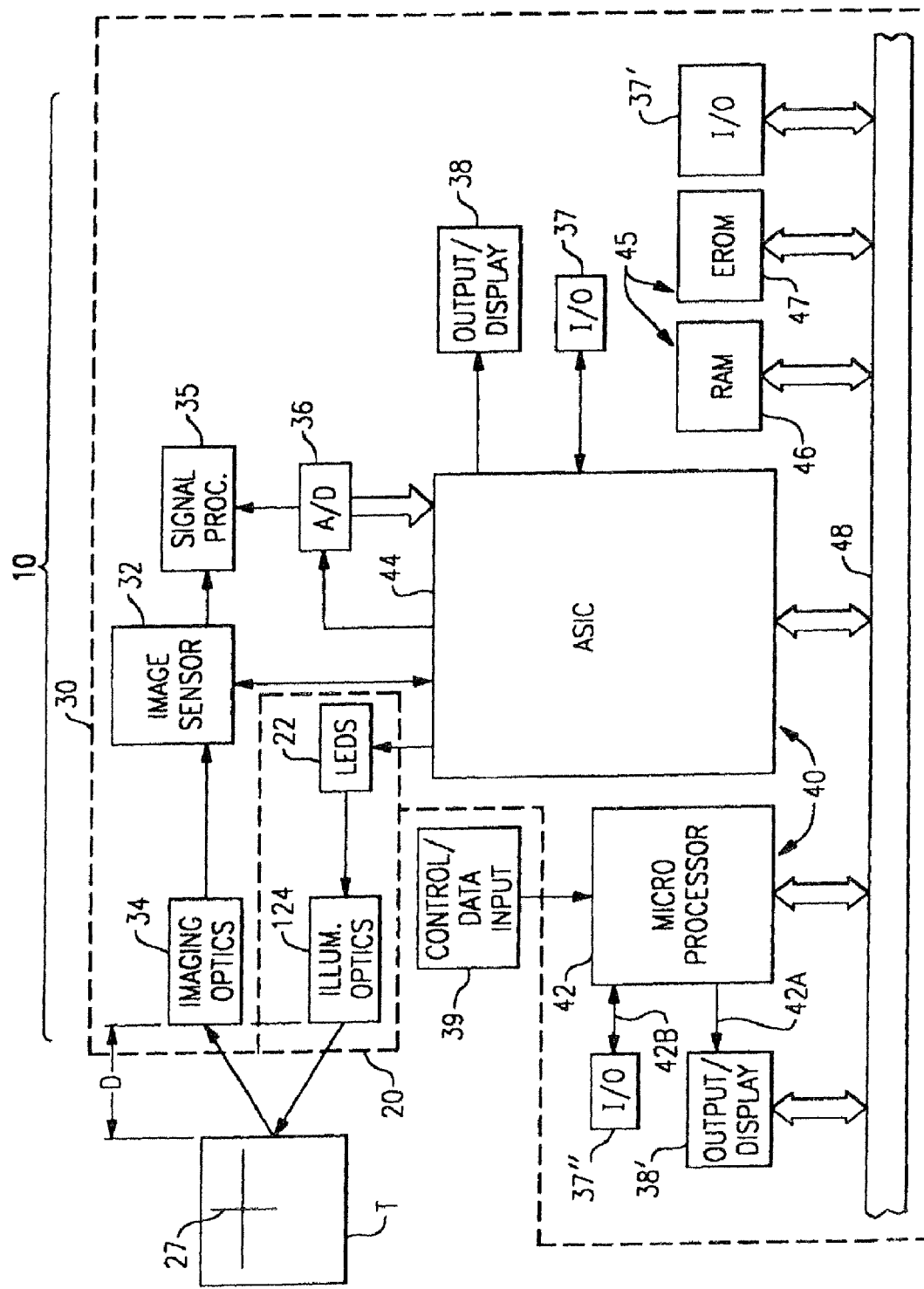
FIG. 2a is a block diagram of an optical reader of a type in which the invention may be incorporated.
Figure 2B:
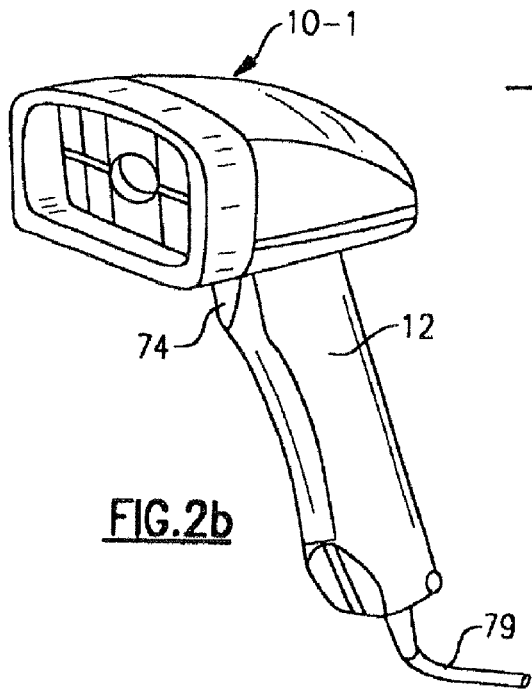
FIGS. 2b-2h show various types of optical reader housings in which the invention may be incorporated.
Figure 2C:
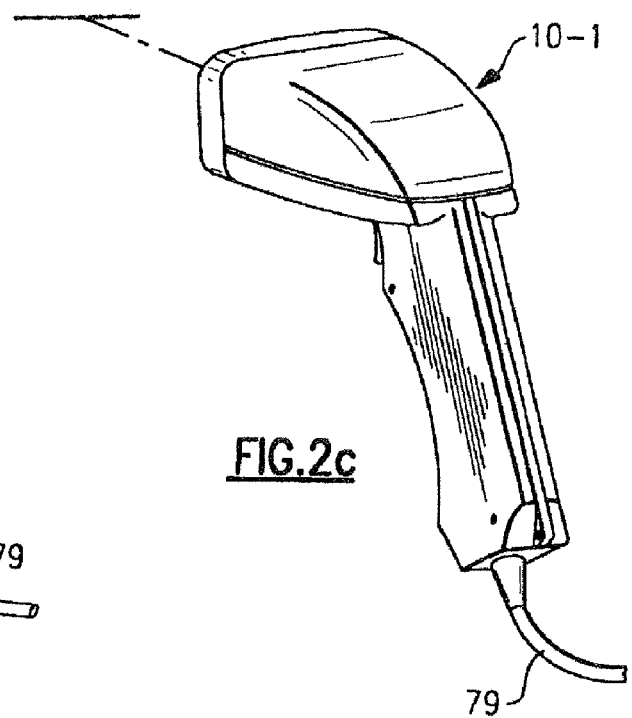
Figure 2D:
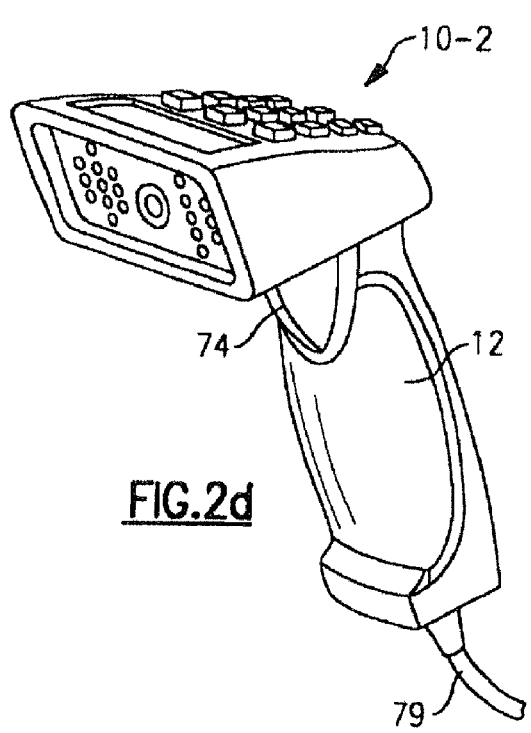
Figure 2E:
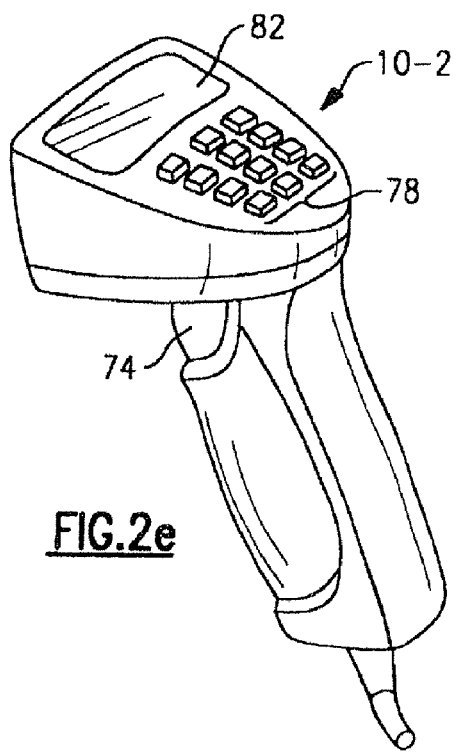
Figure 2F:
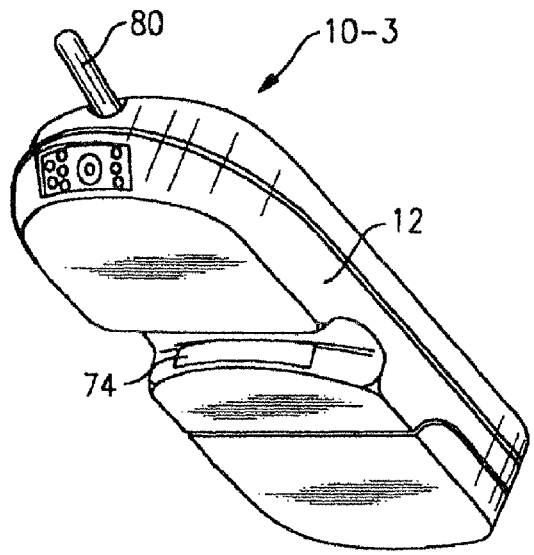
Figure 2G:
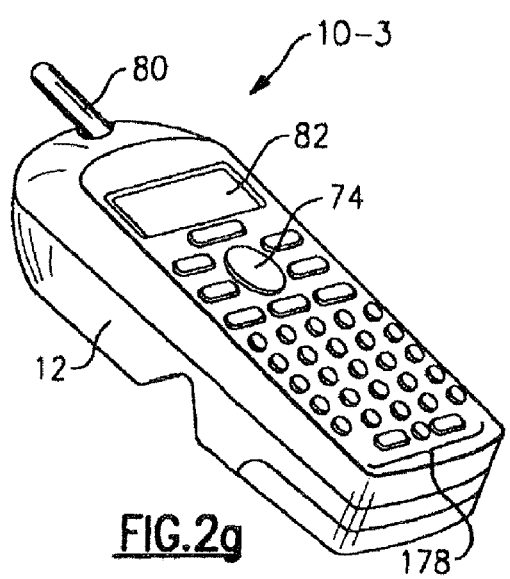

Optical reader 10 of FIG. 2a also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as a read/write random access memory or RAM 46 and an erasable read only memory or EROM 47. RAM 46 typically includes at least one volatile memory device but may include one or more long term non-volatile memory devices. Processor 42 and ASIC 44 are also both connected to a common bus 48 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding image data stored in RAM 46 in accordance with program data stored in EROM 47. Processor 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processors 42 and 44 will naturally depend on the type of off-the-shelf microprocessors that are available, the type of image sensor which is used, the rate at which image data is output by imaging assembly 30, etc. There is nothing in principle, however, that requires that any particular division of labor be made between processors 42 and 44, or even that such a division be made at all. This is because special purpose processor 44 may be eliminated entirely if general purpose processor 42 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 2a, a typical division of labor between processors 42 and 44 will be as follows. Processor 42 is preferably devoted primarily to such tasks as decoding image data, once such data has been stored in RAM 46, recognizing characters represented in stored image data according to an optical character recognition (OCR) scheme, handling menuing options and reprogramming functions, processing commands and data received from control/data input unit 39 which may comprise such elements as trigger 74 and keyboard 78 and providing overall system level coordination.

Processor 44 is preferably devoted primarily to controlling the image acquisition process, the A/D conversion process and the storage of image data, including the ability to access memories 46 and 47 via a DMA channel. Processor 44 may also perform many timing and communication operations. Processor 44 may, for example, control the illumination of LEDs 22, the timing of image sensor 32 and an analog-to-digital (A/D) converter 36, the transmission and reception of data to and from a processor external to reader 10, through an RS-232, a network such as an Ethernet, a serial bus such as USB, a wireless communication link (or other) compatible I/O interface 37. Processor 44 may also control the outputting of user perceptible data via an output device 38, such as a beeper, a good read LED and/or a display monitor which may be provided by a liquid crystal display such as display 82. Control of output, display and I/O functions may also be shared between processors 42 and 44, as suggested by bus driver I/O and output/display devices 37' and 38' or may be duplicated, as suggested by microprocessor serial I/O ports 42A and 42B and I/O and display devices 37" and 38'. As explained earlier, the specifics of this division of labor is of no significance to the present invention.

FIGS. 2b through 2g show examples of types of housings in which the present invention may be incorporated. FIGS. 2b-2g show 1D/2D optical readers 10-1, 10-2 and 10-3. Housing 12 of each of the optical readers 10-1 through 10-3 is adapted to be graspable by a human hand and has incorporated therein at least one trigger switch 74 for activating image capture and decoding and/or image capture and character recognition operations. Readers 10-1 and 10-2 include hard-wired communication links 79 for communication with external devices such as other data collection devices or a host processor, while reader 10-3 includes an antenna 80 for providing wireless communication device or a host processor.

In addition to the above elements, readers 10-2 and 10-3 each include a display 82 for displaying information to a user and a keyboard 78 for enabling a user to input commands and data into the reader.

Figure 2H:
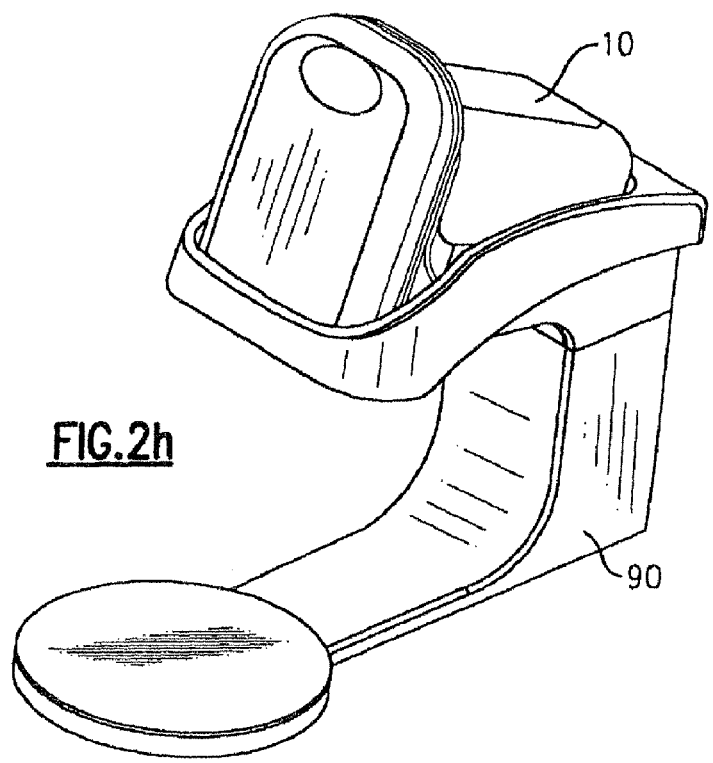

Any one of the readers described with reference to FIGS. 2b through 2g may be mounted in a stationary position as is illustrated in FIG. 2h showing a generic optical reader 10 docked in a scan stand 90. Scan stand 90 adapts portable optical reader 10 for presentation mode scanning. In a presentation mode, reader 10 is held in a stationary position and an indicia bearing article is moved across the field of view of reader 10.

As will become clear from the ensuing description, the invention need not be incorporated in a portable optical reader. The invention may also be incorporated, for example, in association with a control circuit for controlling a non-portable fixed mount imaging assembly that captures image data representing image information formed on articles transported by an assembly line, or manually transported across a checkout counter at a retail point of sale location. Further, in portable embodiments of the invention, the reader need not be hand held. The reader may be part or wholly hand worn, finger worn, waist worn or head worn for example.

Referring again to particular aspects of the invention, a low resolution frame clock out mode of the invention is described in detail with reference to the pixel maps of FIGS. 1a and 1b. Control circuit 40 establishes a clock out rate for clocking out an electrical signal corresponding to a pixel of an image sensor 32 by appropriate state control of control signals in communication with image sensor 32. In the present invention, image sensor 32 is selected to be of a type whose pixel clock out rate can be varied by way of control signals received from control circuit 40. In presently available optical readers, an image sensor's pixel clock out rate is not changed during the course of clocking out of a frame of image data.

In a "low resolution" frame clock out mode of the invention, however, control circuit 40 causes image sensor 32 to clock out electrical signals corresponding to the pixels of the array at least two speeds during a single frame capture period. During a single frame clock out period, control circuit 40 controls image sensor 32 so that some pixels are clocked out at normal clock out rate sufficient to develop electrical signals accurately representing the intensity of light at the respective pixel positions, while other pixels are either not clocked out or are clocked out at a clock out rate which may be insufficient to allow development of electrical signals that accurately represent the intensity of light at the respective pixels but which nevertheless results in a reduction of the overall frame clock out time of the frame of image data being clocked out.

Figure 1A:
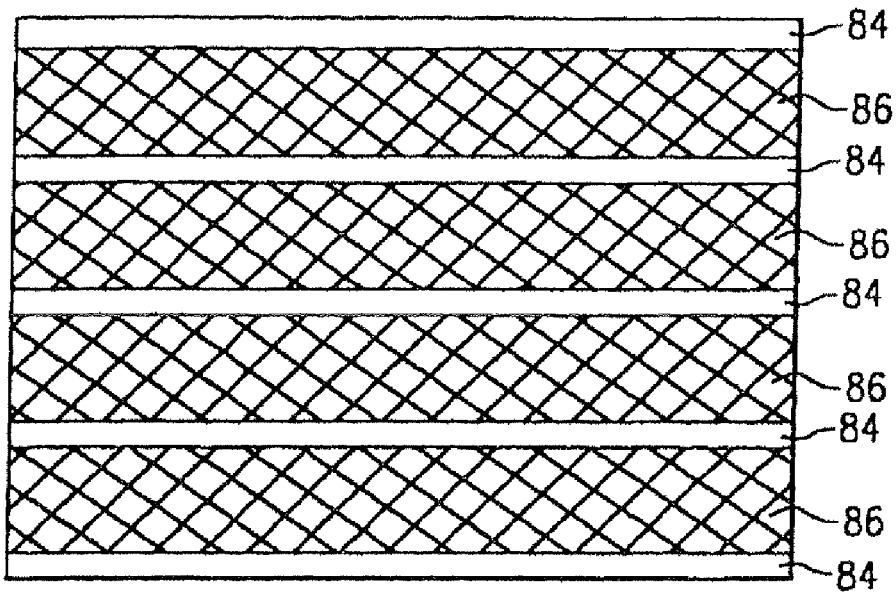
FIGS. 1a and 1b are image maps illustrating possible low resolution frames of image data clock out during a low resolution frame clock out mode of the invention.

FIG. 1a shows a schematic diagram of an exemplary image map frame that is clocked out according to the low resolution frame clock out mode of the invention and then captured into memory 45. The image map is divided into "zones" of valid data and invalid data. Valid zones 84 shown are rows of pixels that are clocked out at a normal clock out speed while invalid zones 86 shown are rows of pixels that are clocked out at a faster clock out speed, which is normally (but not necessarily) a speed insufficient to allow development of electrical signals accurately representing the intensity of light at a pixel.

Figure 1B:
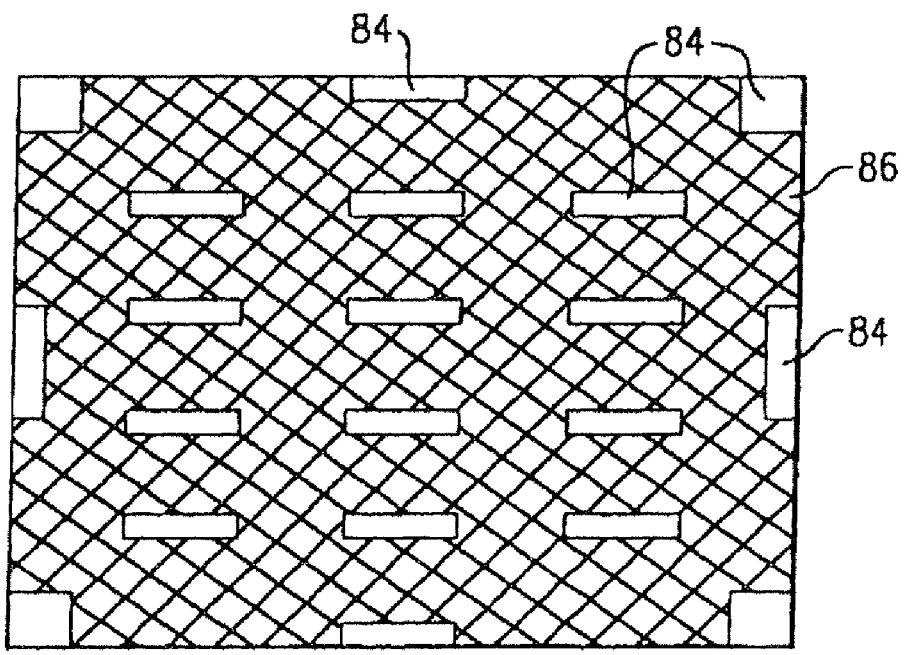

FIG. 1b shows another possible division of an image map into valid zones and invalid zones. This type of embodiment in which valid zones 84 comprise less than full pixel rows is conveniently realized by appropriate control of an image sensor manufactured using CMOS fabrication methods. Using CMOS fabrication methods, an image sensor can be merged with a microprocessor, an ASIC, or another timing device on a single die to the end that a pre-established clocking sequence in which a pixel clock out rate is changed multiple times during the course of clock out a frame of image data may be actuated in response to the activation of a single control signal in communication with image sensor 32.

Using CMOS fabrication techniques, image sensors are readily made so that electrical signals corresponding to certain pixels of a sensor can be selectively clocked out without clocking out electrical signals corresponding to remaining pixels of the sensor. CMOS image sensors are available from such manufacturers as Symagery, Pixel Cam, Omni Vision, Sharp, Natural Semiconductor, Toshiba, Hewlett-Packard and Mitsubishi. Further aspects of a partial frame clock out mode are described in commonly assigned application Ser. No. 09/766,806 entitled "Optical Reader Having Partial Frame Operating Mode," now U.S. Pat. No. 6,637,658 filed concurrently herewith and incorporated herein by reference.

The invention is also conveniently realized with use of an image sensor having an image sensor discharge function. Image sensors having a discharge function are typically adapted to receive a discharge clock out signal which when active results in all pixels of a frame being read out at a high clock out rate insufficient to allow development of electrical signals. In presently available readers having a directional function, a control circuit sets the discharge clocking signal to an active state while clocking out an initial "discharge period" frame of image data immediately after reception of a trigger actuation. This initial discharge process removes any residual charges built up on image sensor 32 prior to capturing a first frame including valid pixel data.

For producing an image map divided into valid and invalid zones using an image sensor having a discharge function, control circuit 40 may be made to intermittently change the state of a discharge clock out signal during a frame clock out period during which image sensor 32 is otherwise operated according to a normal resolution clock out mode.

Figure 3A:
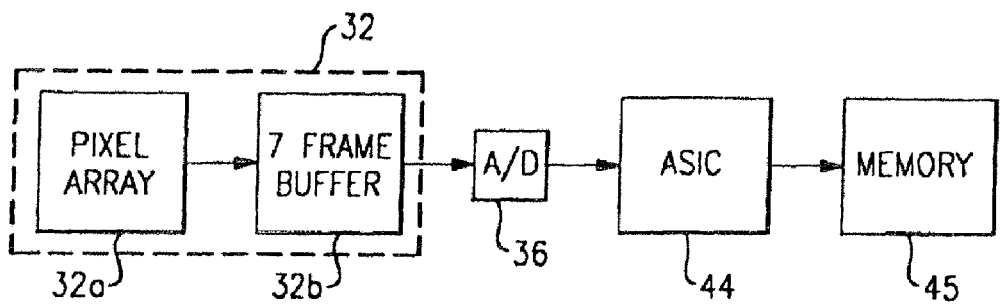
FIG. 3a is a process flow diagram illustrating frame clocking operations in an optical reader having an image sensor including a one-frame buffer.
Figure 3B:
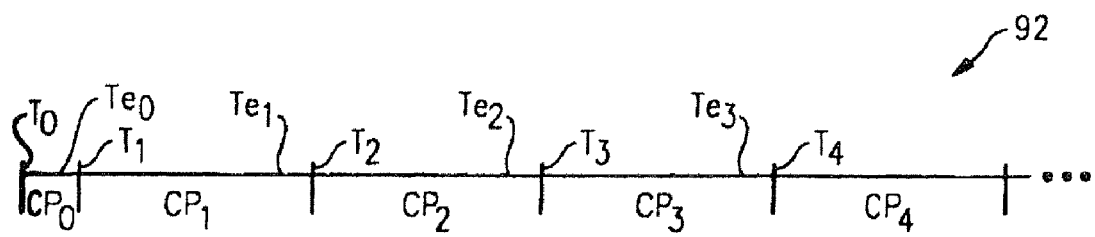
FIG. 3b is a time line illustrating frame clock out operations in a prior art optical reader.
Figure 3C:
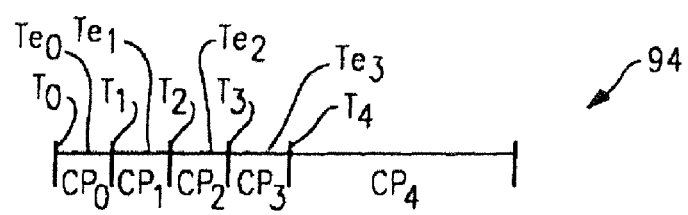
FIG. 3c is a time line illustrating a frame clock out of operations in an optical reader operated according to the invention.

An exemplary embodiment of the invention in which the invention is employed in a reader equipped with a SONY ICX084AL CCD image sensor (that includes a one frame analog buffer memory) and a SONY CXD2434TQ timing generator is described with reference to FIGS. 3a, 3b and 3c. FIG. 3a shows a flow diagram, of an imaging system in which the image sensor includes a one frame buffer memory. For purposes of illustrating the advantages of the invention, FIG. 3b shows a time line illustrating the time required to clock out and capture a frame of image data useful for searching and decoding in a prior art reader having a buffer memory not configured to operate in accordance with a low resolution frame clock out mode. FIG. 3c shows a time line illustrating the time required to clock out and capture a frame of image data useful for searching, decoding, and recognizing characters in a reader having a buffer memory configured to operate in a low resolution frame clock out mode according to the invention.

When a reader includes a one frame buffer memory, then the activation of an appropriate frame clock out signal by image sensor 32 causes electrical charges representative of light on pixels of an image sensor's pixel array 32a to be transferred to analog buffer memory 32b and causes electrical signals corresponding to pixel value storage locations of buffer 32b (representing light on the pixels during a previous timing period) to be clocked out to analog to digital converter 36 so that the frame of image data stored on buffer memory can be captured in memory 45, wherein the data may be read by control circuit 40.

Referring to time line 92 corresponding a prior art reader it can be seen that a substantial parameter determination delay is present without use of a low resolution frame capture mode according to the invention. At time T0, control circuit 40 activates a frame discharge control signal so that residual charges built up in the storage locations of buffer memory 32b are eliminated or "cleaned" during clock out period CP0.

At time T1, control circuit 40 activates a frame clocking signal to commence the clock out a first frame of pixel data according to a normal resolution frame clock out mode (the pixel data clocked out during clock out period CP1 is normally invalid pixel data). During clock out period CP1, the charges built up on pixel array 32a during clock out period CP0 are transferred to buffer memory 32b and then clocked out to A/D converter 36. Also during clock out period CP1 pixel array 32a is exposed to light for a time determined by an exposure parameter value, $e_0$, that was previously transmitted at time $Te_0$ prior to time T1. The exposure parameter $e_0$ is based on previous exposure values during a previous trigger actuation period or based on expected illumination conditions, but is not based on actual illumination conditions present.

At time T2, control circuit 40 activates a frame clock out signal to commence the clock out of a second frame of image data in accordance with a normal resolution frame clock out mode. During clock out period CP2, the charges built up on pixel array 32a during clock out period CP1 are transferred to buffer memory 32b and then clocked out to A/D converter 36. Also during clock out period CP2 pixel array 32 is exposed to light for a time determined by an exposure parameter value, $e_1$, that was previously transmitted at time Te1 prior to time T2. The exposure parameter $e_1$, like exposure parameter $e_0$, also cannot be based on actual illumination conditions since the most recent frame image data available for reading by circuit 40 prior to the transmittal of exposure parameter $e_1$ is the invalid frame data resulting from transmittal of frame discharge signal at time T0.

At time T3, control circuit 40 activates a frame clock out signal to commence the capture of a third frame of image data in accordance with a normal resolution frame clock out mode. During clock out period CP3, the charges built up on pixel array 32a during clock out period CP2 are transferred to buffer memory 32b and then clocked out to A/D converter 36. Also during clock out period CP3, pixel array 32a is exposed to light for a time determined by an exposure parameter value, $e_2$, that was previously transmitted at time $Te_2$ prior to time T3. Unlike the previous exposure values $e_0$ and $e_1$, the exposure parameter value $e_2$ can be a value determined from actual illumination conditions since the frame of image data resulting from pixel array 32a being exposed to light during clock out period CP1, is available for reading by control circuit 40 prior to the time that the exposure parameter $e_2$ must be communicated to image sensor 32. However, because of the built in one frame delay resulting from the presence of buffer 32b, it is seen that a frame of image data clocked out while being exposed with the exposure parameter value $e_2$, determined based on actual illumination conditions, will not be available for reading by control circuit unit after the expiration of clocking period CP4. Accordingly, it can be seen that the above reader exhibits a typical parameter determination delay of four normal resolution clock out periods, CP1+CP2+CP3+CP4 plus the frame discharge clock out parameter CP0. The normal resolution frame clock out period of the above-referenced SONY image sensor is about 33.37 ms and the frame discharge period is about 8.33 ms, resulting in a typical-case total parameter determination delay in the example described of 140 ms (an earlier frame may be subjected to image data searching, decoding, and recognition if $e_0$ or $e_1$ yields an image of acceptable quality).

Advantages of operating image sensor 32 according to a low resolution frame clock out mode of operation are easily observable with reference to time line 94 corresponding to a reader having an image sensor operated in accordance with a low resolution frame clock out mode. In the example illustrated by time line 94 control circuit 40 operates image sensor as described in connection with FIG. 3b except that control circuit 40 operates image sensor 32 according to a low resolution frame clock out mode during clocking periods CP1, CP2, and CP3. Because electrical signals corresponding to only some of the pixels during these timing periods are clocked out at speeds sufficiently slow to read valid image data, the total frame clock out time associated with these clocking periods is significantly shorter than that of a frame clocked out according to a normal resolution frame clock out mode. In an exemplary embodiment in which control circuit 40 alternatingly changes the state of a discharge clock out control signal (known as an EFS signal) in communication with a SONY ICX084AL CCD image sensor, to result in a zone division pattern having valid zones comprising four pixel rows clocked out at normal speed bounded by invalid rows having eighteen rows of pixels clocked out at high speed, the low resolution frame clock out rate is 8.52 ms. The overall typical parameter determination delay is therefore reduced to T0+T1+T2+T3+T4=66.2 ms as compared to the 140 ms delay in the prior art reader example described with reference to FIG. 3a.

In the example described in which image sensor 32 comprises a one frame buffer 32b, pixel array 32a is exposed to light for at least some time currently as electrical signals are clocked out from buffer 32b. In the control of presently available image sensors that do not have one frame buffers, frame clock out periods normally follow frame exposure periods without overlapping the exposure periods.

A low resolution parameter determination frame of image data clocked out using a low resolution clock out mode is useful for determining an exposure control parameter because exposure parameter values can be accurately determined by sampling only a small percentage of pixel values from a frame of image data. In fact, for improving the processing speed of an optical reader it is preferred to determine an exposure control value based on a sampling of a small percentage of pixel values from a frame of image data. The proper exposure parameter setting varies substantially linearly with illumination conditions, and therefore is readily determined based on a sampling of pixel values from a single frame of image data.

Additional reader operating parameters can be determined by reading pixel values from a frame of image data clocked out according to a low resolution clock out mode of the invention. These additional parameters which may be determined from a low resolution parameter determining frame of image data include an amplification parameter for adjusting the gain of an amplifier prior to analog-to-digital conversion, an illumination level parameter for adjusting the current level delivered to, and therefore the radiance of light emitted from LEDs 22, an illumination time parameter for adjusting the on-time of LEDs 22, a light level parameter for adjusting a light level of a subsequently captured frame of image data, a dark level parameter for adjusting a dark level of a subsequently captured frame of image data, and an analog-to-digital converter reference parameter for adjusting a reference voltage of analog-to-digital converter 36.

Referring to FIGS. 4a-4g the invention is an optical reader equipped with a 2D image sensor that is configured to operate in a partial frame capture mode. In a partial frame clock out mode, a control circuit of an optical reader clocks out (or "reads") electrical signals corresponding to less than all of the 2D image sensor's pixels, and captures image data corresponding to the pixel locations into memory.

Partial frames of image data which may be clocked out and captured by an optical reader control circuit during a partial frame capture mode are illustrated in FIGS. 4a-4g in which valid zones 212 represent frame image data corresponding to image sensor pixel positions that are clocked out and invalid zones (indicated by the shaded regions of the views of FIGS. 4a-4g) represent potential image data positions corresponding to pixel positions that are not clocked out.

Border 210 defines the full field of view of an optical reader in the case the reader is operated in a full frame captured mode while symbols 216-1, 216-2, 216-3, 216-4, 216-6 and 216-7 are symbols entirely within the full field of view of an optical reader defined by border 10 but are only partially within certain valid zones shown. Valid zones 212-1, 212-3, 212-7, 212-8, 212-9, 212-10, and 212-13 are valid zones of image data that partially contain representations of a decodable symbol while valid zones 212-11 and 212-12 are valid zones of image data captured during a partial frame capture mode which contain representations of an entire decodable symbol.

In the examples illustrated with reference to FIGS. 4a-4e an optical reader operating in a partial frame clock out mode clocks out electrical signals corresponding to linear patterns of pixels. It is useful to cause a reader to clock out electrical signals corresponding to linear patterns as shown in FIGS. 4a-4d when a reader will be used to decode mainly 1D linear bar code symbols.

In the examples illustrated with reference to FIGS. 4f and 4g an optical reader operating in a partial frame clock out mode clocks out electrical signals corresponding to non-linear groupings of pixels. It is useful to cause a reader to clock out electrical signals corresponding to pixel groupings as shown in FIGS. 4f and 4g when a reader will be used to decode symbols which are expected to be within a certain position in an image sensor's field of view.

A reader may be configured so that the reader automatically switches out of partial frame capture mode on the sensing of a certain condition. For example a reader according to the invention may be made to switch out of partial frame capture operating mode and into a full frame capture mode on the sensing that a 2D symbol is partially represented in the partial frame of image data, or on the condition that processing of the partial frame of image data fails to result in image data being decoded.

An optical reading system in which the invention may be employed is described with reference to the block diagram of FIG. 5a.

Optical reader 110 includes an illumination assembly 120 for illuminating a target object T, such as a 1D or 2D bar code symbol, and an imaging assembly 130 for receiving an image of object T and generating an electrical output signal indicative of the data optically encoded therein. Illumination assembly 120 may, for example, include an illumination source assembly 122, together with an illuminating optics assembly 124, such as one or more lenses, diffusers, wedges, reflectors or a combination of such elements, for directing light from light source 122 in the direction of a target object T. Illumination assembly 120 may comprise, for example, laser or light emitting diodes (LEDs) such as white LEDs or red LEDs. Illumination assembly 120 may include target illumination and optics for projecting an aiming pattern 127 on target T. Illumination assembly 120 may be eliminated if ambient light levels are certain to be high enough to allow high quality images of object T to be taken. Imaging assembly 130 may include an image sensor 132, such as a 1D or 2D CCD, CMOS, NMOS, PMOS, CID OR CMD solid state image sensor, together with an imaging optics assembly 134 for receiving and focusing an image of object T onto image sensor 132. The array-based imaging assembly shown in FIG. 5a may be replaced by a laser array based imaging assembly comprising multiple laser sources, a scanning mechanism, emit and receive optics, at least one photodetector and accompanying signal processing circuitry.

The partial frame clock out mode is readily implemented utilizing an image sensor which can be commanded to clock out partial frames of image data or which is configured with pixels that can be individually addressed. Using CMOS fabrication techniques, image sensors are readily made so that electrical signals corresponding to certain pixels of a sensor can be selectively clocked out without clocking out electrical signals corresponding to remaining pixels of the sensor. CMOS image sensors are available from such manufacturers as Symagery, Pixel Cam, Omni Vision, Sharp, National Semiconductor, Toshiba, Hewlett-Packard and Mitsubishi. A partial frame clock out mode can also be carried out by selectively activating a frame discharge signal during the course of clocking out a frame of image data from a CCD image sensor, as is explained in concurrently filed U.S. patent application Ser. No. 09/766,922, entitled "Optical Reader Having Reduced Parameter Determination Delay," incorporated previously herein by reference.

Optical reader 110 of FIG. 5a also includes programmable control circuit 140 which preferably comprises an integrated circuit microprocessor 142 and an application specific integrated circuit (ASIC 144). The function of ASIC 144 could also be provided by field programmable gate array (FPGA). Processor 142 and ASIC 144 are both programmable control devices which are able to receive, output, and process data in accordance with a stored program stored in memory unit 145 which may comprise such memory elements as a read/write random access memory or RAM 146 and an erasable read only memory or EROM 147. RAM 146 typically includes at least one volatile memory device but may include one or more long term non-volatile memory devices. Processor 142 and ASIC 144 are also both connected to a common bus 148 through which program data and working data, including address data, may be received and transmitted in either direction to any circuitry that is also connected thereto. Processor 142 and ASIC 144 differ from one another, however, in how they are made and how they are used.

More particularly, processor 142 is preferably a general purpose, off-the-shelf VLSI integrated circuit microprocessor which has overall control of the circuitry of FIG. 5a, but which devotes most of its time to decoding image data stored in RAM 146 in accordance with program data stored in EROM 147. Processor 144, on the other hand, is preferably a special purpose VLSI integrated circuit, such as a programmable logic or gate array, which is programmed to devote its time to functions other than decoding image data and, thereby, relieve processor 142 from the burden of performing these functions.

The actual division of labor between processors 142 and 144 will naturally depend on the type of off-the-shelf microprocessors that are available, the type of image sensor which is used, the rate at which image data is output by imaging assembly 130, etc. There is nothing in principle, however, that requires that any particular division of labor be made between processors 142 and 144, or even that such a division be made at all. This is because special purpose processor 144 may be eliminated entirely if general purpose processor 142 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 5a, a typical division of labor between processors 142 and 144 will be as follows. Processor 142 is preferably devoted primarily to such tasks as decoding image data, once such data has been stored in RAM 146, recognizing characters represented in stored image data according to an optical character recognition (OCR) scheme, handling menuing options and reprogramming functions, processing commands and data received from control/data input unit 139 which may comprise such elements as trigger 174 and keyboard 178 and providing overall system level coordination.

Processor 144 is preferably devoted primarily to controlling the image acquisition process, the A/D conversion process and the storage of image data, including the ability to access memories 146 and 147 via a DMA channel. Processor 144 may also perform many timing and communication operations. Processor 144 may, for example, control the illumination of LEDs 122, the timing of image sensor 132 and an analog-to-digital (A/D) converter 136, the transmission and reception of data to and from a processor external to reader 110, through an RS-232, a network such as an Ethernet, a serial bus such as USB, a wireless communication link (or other) compatible I/O interface 137. Processor 144 may also control the outputting of user perceptible data via an output device 138, such as a beeper, a good read LED and/or a display monitor which may be provided by a liquid crystal display such as display 182. Control of output, display and I/O functions may also be shared between processors 142 and 144, as suggested by bus driver I/O and output/display devices 137' and 138' or may be duplicated, as suggested by microprocessor serial I/O ports 142A and 142B and I/O and display devices 137' and 138'. As explained earlier, the specifics of this division of labor is of no significance to the present invention.

Some or all of the above optical and electronic components may be incorporated in an imaging module as are described in commonly assigned U.S. patent application Ser. No. 09/411, 936, incorporated herein by reference.

FIGS. 5b-5g show examples of types of housings in which the present invention may be incorporated. FIGS. 5b-5g show 1D/2D optical readers 110-1, 110-2 and 110-3. Housing 112 of each of the optical readers 110-1 through 110-3 is adapted to be graspable by a human hand and has incorporated therein at least one trigger switch 174 for activating image capture and decoding and/or image capture and character recognition operations. Readers 110-1 and 110-2 include hard-wired communication links 179 for communication with external devices such as other data collection devices or a host processor, while reader 110-3 includes an antenna 180 for providing wireless communication device or a host processor.

In addition to the above elements, readers 110-2 and 110-3 each include a display 182 for displaying information to a user and a keyboard 178 for enabling a user to input commands and data into the reader. Control circuit 140 may cause a graphical user interface (GUI) to be displayed on display 182. A pointer on the GUI may be moved by an actuator or actuators protruding from housing 112.

Figure 5H:
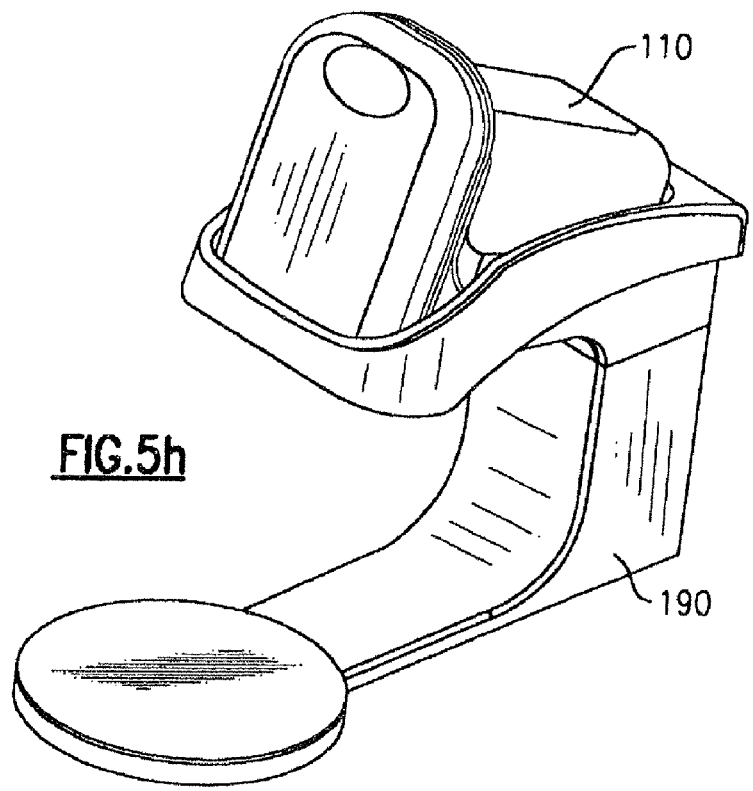

Any one of the readers described with reference to FIGS. 5b-5g may be mounted in a stationary position as is illustrated in FIG. 5h showing a generic optical reader 110 docked in a scan stand 190. Scan stand 190 adapts portable optical reader 110 for presentation mode scanning. In a presentation mode, reader 110 is held in a stationary position and an indicia bearing article is moved across the field of view of reader 110.

As will become clear from the ensuing description, the invention need not be incorporated in a portable optical reader. The invention may also be incorporated, for example, in association with a control circuit for controlling a non-portable fixed mount imaging assembly that captures image data representing image information formed on articles transported by an assembly line, or manually transported across a checkout counter at a retail point-of-sale location. Further, in portable embodiments of the invention, the reader need not be hand held. The reader may be part or wholly hand worn, finger worn, waist worn or head worn for example.

Figure 4A:
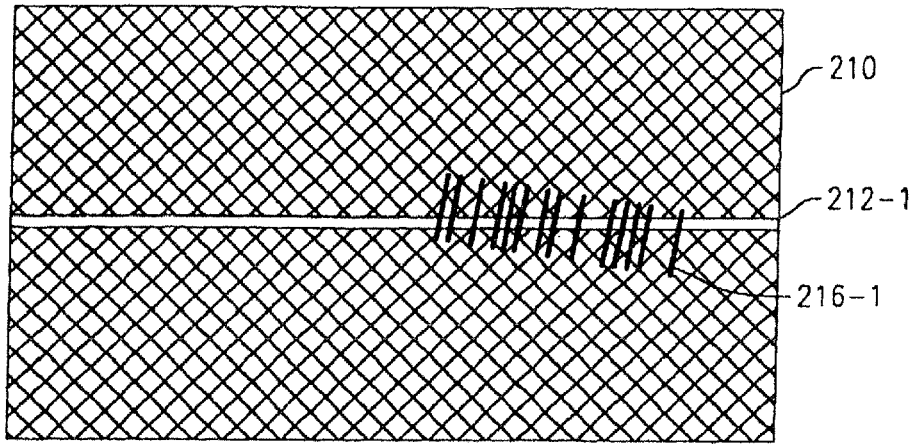

Referring again to particular aspects of the invention, control circuit 140 in the example of FIG. 4a executes a partial frame capture mode in order to clock out and capture pixel data illustrated by valid zone 212-1. Reading the pixel values of valid zone 212-1 is effective to decode 1D symbol 216-1 in the reader's full field of view. Given that clocking out and capturing image data of valid zone 212-1 consumes less time than clocking out and capturing a full frame of image data, it is seen that execution of a partial frame capture mode decreases the decode time of the reader. In prior art 2D optical readers, electrical signals corresponding to full frame 210 are clocked out in order to decode a single 1D symbol 216-1. The pixels of valid zone 212-1 may comprise a single row of pixels (a scan line) or a plurality of rows.

Figure 4B:
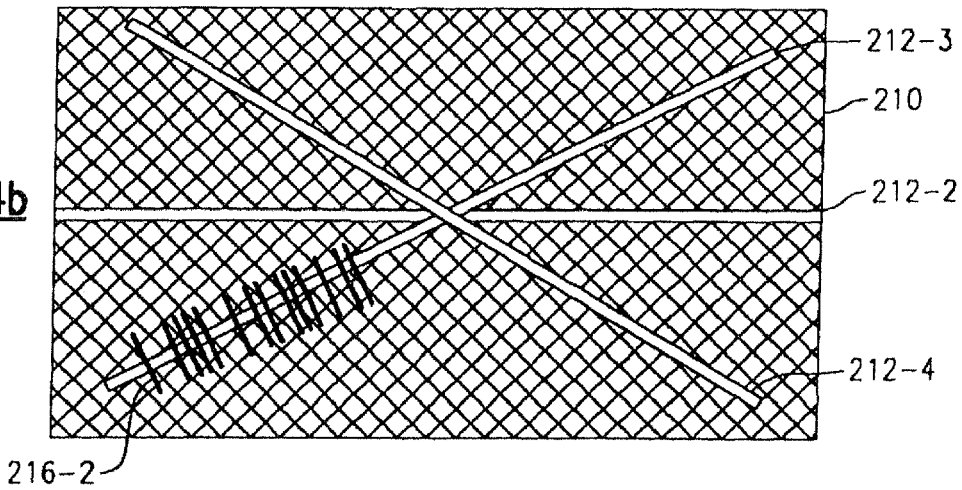

In the example of FIG. 4b, of control circuit 140 executes a partial frame capture mode in order to capture data defining valid zones 212-2, 212-3 and 212-4 of a full frame of image data corresponding to a full field of view of a 2D image sensor. Valid zones 212-2, 212-3 and 212-4 are line patterns of image data at various angular orientations. Reading of pixels of line valid zones arranged at various angular orientations is effective to decode a 1D symbol which may be located at an oblique angle in a field of view. It is seen that reading of pixels of line valid zone 212-3 will result in the successful decoding of 1D bar code symbol 216-2. Zones 212-2, 212-3 and 212-4 may be one or more pixels wide.

Figure 4C:
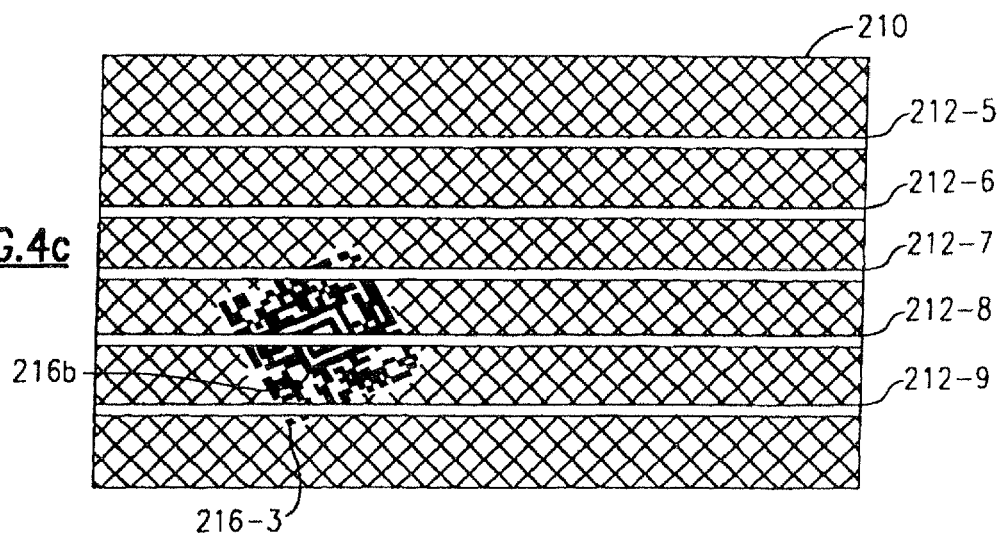

In the example of FIG. 4c, control circuit 140 executes a partial frame capture mode in order to clock out and capture image data defining valid zones 212-5 through 212-9. Valid zones 212-5 to 212-9 form a plurality of horizontal parallel lines. The pattern of valid zones shown in FIG. 4c clocked out and captured in a partial frame capture mode is effective for decoding substantially horizontally oriented 1D symbols which are at an unknown height in a full field of view. It is seen that the reading of image data of valid zone 212-8 will not result in the decoding of symbol 216-3 because symbol 216-3 is not a 1D symbol. Nevertheless, because valid zone 212-8 intersects symbol bullseye 216-6, reading of image data of valid zone 212-8 may be effective to determine that a 2D symbol is likely present in the full field of view of image sensor 132. In one aspect of the invention, reader 110 may be configured to switch out of a partial frame capture mode and into a full frame capture mode when reading of image data captured in the partial frame capture mode reveals that a 2D symbol is likely to be represented in the image data corresponding to the image sensor's full field of view.

The states of operation of reader 110 operating in accordance with the invention are normally selected by actuating appropriate buttons of keyboard 178, or control of a GUI, or by the reading of menuing symbols, as are explained in commonly assigned U.S. Pat. No. 5,929,418 incorporated herein by reference.

It should be apparent that several operating states of the invention are possible. In a first operating state, reader 110 is made to operate only in a partial frame capture mode until the time the first operating state is deactivated.

In a second operating state, as is alluded to in the example of FIG. 4c, the reader operates in a partial frame capture mode until the time that reading of image data captured in the partial frame capture mode reveals that a 2D symbol is likely to be included in the full frame field of view of image sensor 132. When reading of the partial frame of image data reveals that a 2D symbol is likely to be included in a full frame field of view, control circuit 140 captures at least one full frame of image data from sensor 132 and attempts to decode for the 2D symbol determined likely to be represented in the full frame of image data. A reader operating in the second operating state may also be made to switch to a full frame operating mode on the condition that a symbol is not successfully decoded during operation of the reader in the partial frame operating mode.

Figure 4D:
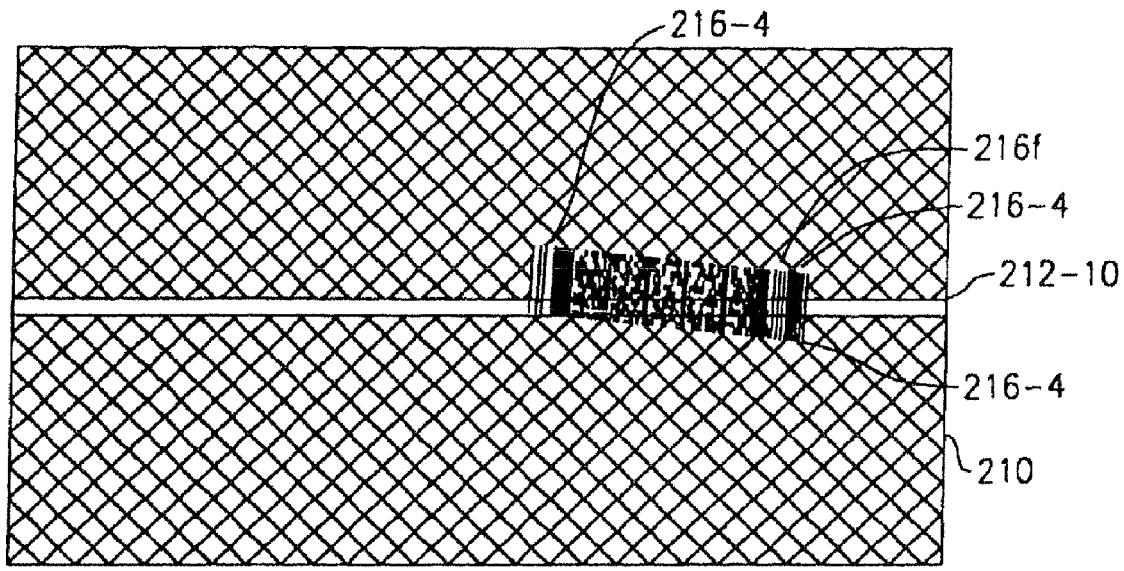

A third operating state of a reader operating in accordance with the invention is described with reference to FIGS. 4d and 4e. Operating in accordance with a third operating state, a reader operates in a partial frame capture mode to clock out and capture image data of valid zone 212-10 which corresponds to a predetermined pattern and position in field of view 210. It is seen that reading of image data of zone 212-10 will not be effective to decode symbol 216-4 because symbol 216-4 is of a type of 2D symbol known as a stacked linear bar code. Control circuit 140 may nevertheless detect that symbol is a 2D symbol given that valid zone 212-10 intersects a finder pattern 216f of symbol 216-4.

Figure 4E:
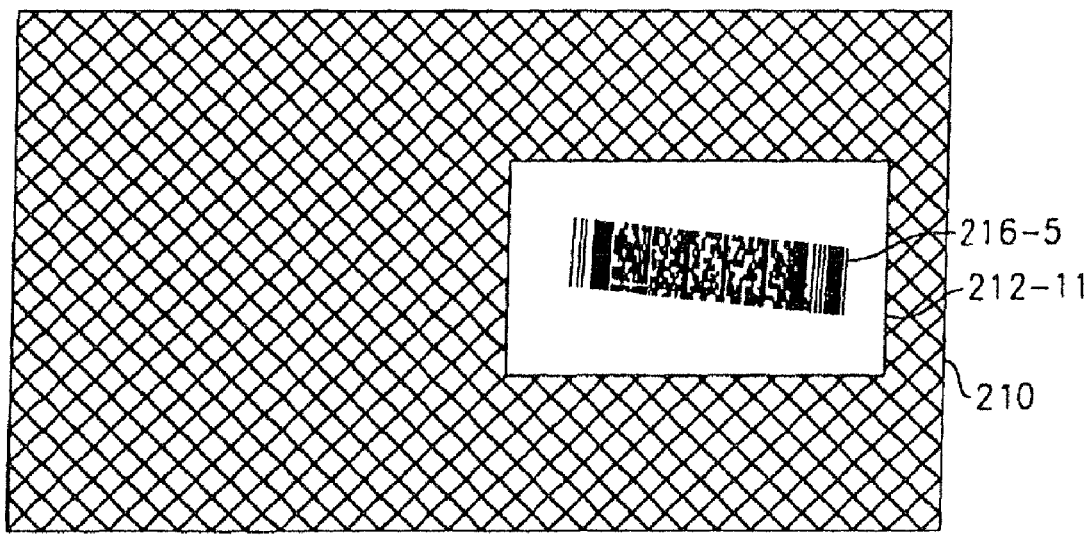
Figure 4F:
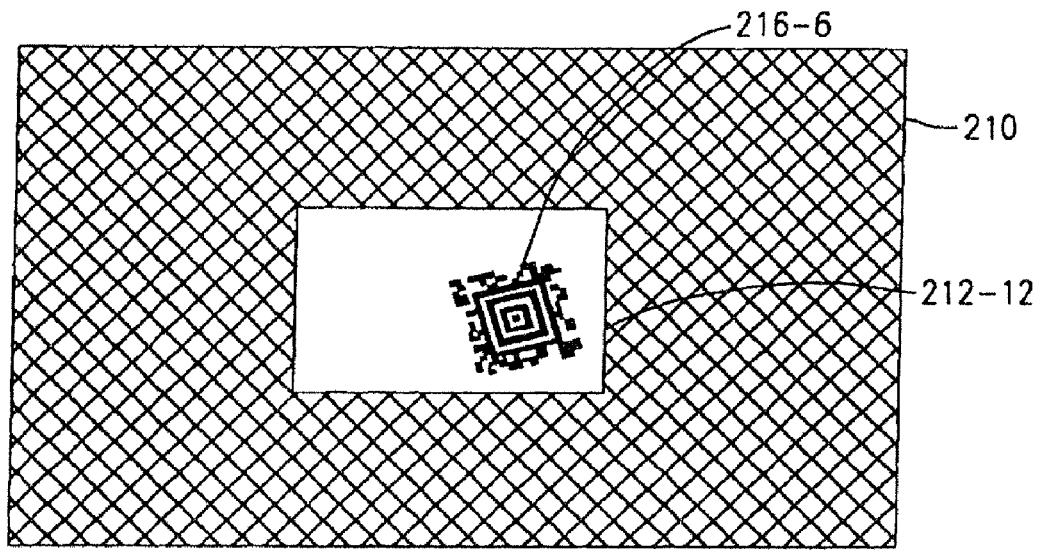
Figure 4G:
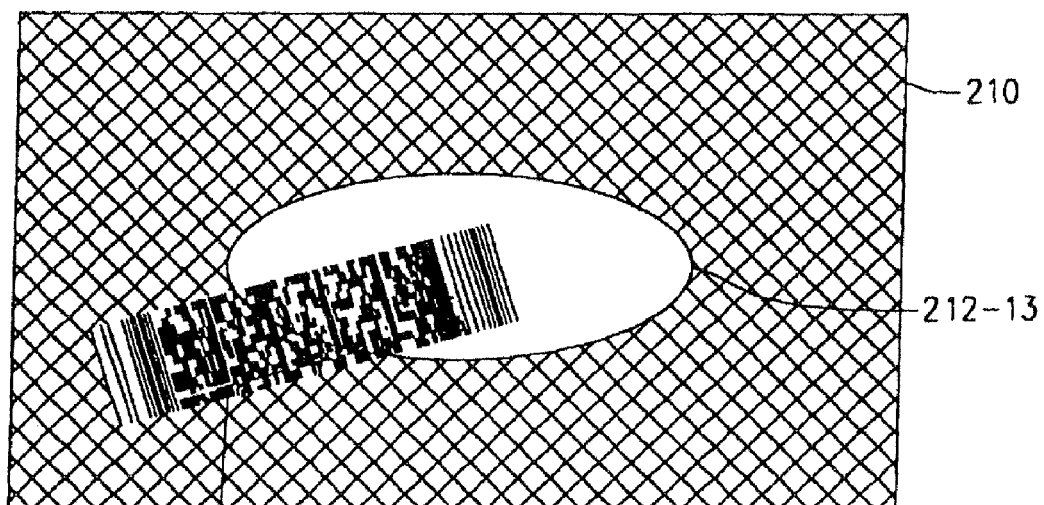

Sensing that a 2D symbol is likely present in the field of view when reading the partial frame image data corresponding to valid zone 212-10, the reader operating in the third operating state then continues to operate in a partial frame mode to clock out and capture image data that defines a second valid zone 212-11 of pixel positions as seen in FIG. 4e. The second valid zone 212-11 is not of a predetermined size and position, but rather is of an adaptive position whose position, and possibly size, orientation and shape depends on the result of the reading of the image data corresponding to the first valid zone 212-10. Specifically, the second valid zone 212-11 is normally at least of a size and position that is likely to encompass the symbol 216-5 detected to be present when reading of the image data of first valid zone 212-10 (labeled 216-4 in FIG. 4d). It is seen that the third operating state is likely to be operative to further reduce the clocking out and capture of irrelevant image data, and therefore is likely to further increase decoding speed. In the third operating state, additional adaptive position valid zones may be clocked out and captured if the reading of image data of first adaptive valid zone 212-11 does not result in a symbol being decoded.

In the example of FIGS. 4f and 41g valid zones 212-12 and 212-13 correspond to nonlinear groupings of pixels. Capturing of the valid zone patterns 212-12 and 212-13 of FIGS. 4f and 4g is particularly useful for decoding symbol image data in the case that a symbol is likely to be at a certain position in relation to an image sensor's full frame field of view such as in the center of an image sensor's field of view as shown in FIG. 4f.

In the example of FIG. 4f control circuit 140 can successfully decode symbol 216-6 because symbol 216-6 is located entirely within valid zone 212-12.

In the example of FIG. 4g, control circuit 140 cannot decode symbol 216-7 if operating in the first operating state since symbol 216-7 is a 2D symbol and is not entirely located within valid zone 212-13. If operating in the second operating state, then a reader capturing image data within valid zone 212-13 may successfully decode symbol 216-7 by reading the image data of zone 212-13 to determine that a 2D symbol is present, switching operation to a full frame capture mode to capture a full frame 210 of image data, and processing the full frame of image data to decode symbol 216-7. A reader operating in the third operating state described hereinabove may decode symbol 216-7, in the example of FIG. 4g, by reading image data within valid zone 212-13, capturing image data within an adaptively defined valid zone (not shown) of sufficient size and position to encompass symbol 216-7, and then processing the image data within the adaptively defined valid zone to decode symbol 216-7.

A bar code reading device having an image sensor including a plurality of pixels can be operated to capture a parameter determination frame of image data, wherein the parameter determination frame of image data includes image data corresponding to light incident at less than all of the pixels of the image sensor. A bar code reading device can also be operated in an image capture operating mode in which a partial frame of image data is captured, wherein the partial frame of image data includes image data corresponding to light incident at less all of the pixels of the image sensor, and wherein image data of the partial frame can be processed in order to attempt to decode a bar code symbol.

According to its major aspects and broadly stated, the present invention is a method for controlling an optical reader to reduce the reader's parameter determination delay. According to the invention, an image sensor is adapted to clock out image data from an image sensor according to two modes of operation, a "low resolution" clock out mode of operation and a "normal resolution" clock out mode of operation.

In a low resolution mode, some pixels of the reader's image sensor pixel array are clocked out at a normal clock out speed sufficient to develop electrical signals that accurately represent the intensity of light incident on the pixel array, while other pixels of the array are either not clocked out or are clocked out at a higher clock out rate which is insufficient to allow development of electrical signals that accurately represent the intensity of light at the respective pixels but which nevertheless, result in an increase in the overall frame clock out rate of the frame of image data. In a normal resolution mode of operation the image sensor is caused to clock out electrical signals corresponding to each pixel of the array at a constant "normal mode" speed which is a speed sufficient to ensure that the electrical signal corresponding to each pixel accurately represents the intensity of light incident on the pixel.

An optical reader according to the invention operates an image sensor in a low resolution mode of operation in order to clock out and capture a parameter-determining frame of image data at high speed, reads pixel data from the parameter determination frame to determine an operation parameter based on actual illumination conditions, then utilizes the operation parameter in operating an image sensor according to high resolution mode in the clocking out of a succeeding frame of image data that is captured and subjected to comprehensive image data processing which may include image data searching, decoding, and/or recognition processing. Clocking out some of the pixels of an array at high speed during execution of the low resolution mode significantly decreases the reader's parameter determination delay.

These parameters determined by reading pixel values from a low resolution parameter determination frame of image data according to the invention may include an exposure time parameter, an amplification parameter for controlling amplification of an electrical signal prior to its analog to digital conversion, an illumination level parameter (intensity or period of illumination), a dark or light level adjustment parameter and an analog-to-digital converter reference voltage parameter for adjusting the high and/or low reference voltages of the reader's analog to digital converter.

In the present invention, an optical reader image sensor is adapted to clock out image data from an image sensor according to "low resolution" mode of operation in order to reduce a parameter determination delay of the reader. In a low resolution mode, some pixels of the readers image sensor array are clock out at normal clock out speed sufficient to develop electrical signals accurately reflecting the intensity of light at the respective pixel positions, while other pixels of the array are either not clocked out or are clocked out at a higher clock out rate which may be insufficient to allow development of electrical signals that accurately represent light incident on the image sensor's sensor array but which nevertheless, results in a reduction of the overall frame clock out rate of the frame of image data. An optical reader according to the invention operates in a low resolution frame clock out mode to capture a low resolution parameter determining frame of image data at high speed, reads pixel data from the parameter determination frame to determine an operation parameter based on actual illumination conditions, then utilizes the operation parameter in operating an optical reader.

[Beginning of section excerpted from U.S. patent application Ser. No. 09/766,806].

The invention is a method for configuring an optical reader having a 2D image sensor so the reader captures and processes image data at higher speeds.

According to the invention, a control circuit of an optical reader equipped with a 2D image sensor is configured to operate in a partial frame operating mode. In a partial frame operating mode, the control circuit clocks out and captures less than a full frame of image data and processes that image data. The control circuit may process the image data of the partial frame, for example, by reading the image data from memory and outputting the image data to an output location such as a display device or a processor system in communication with the reader, by reading and attempting to decode decodable symbols which may be recorded in the partial frame, or by reading and performing optical character recognition on characters represented in the partial frame of image data.

In one embodiment, the partial frame operating mode is employed to clock out and capture image data corresponding to at least one linear pattern sufficient so that a 1D symbol in the field of view of the image sensor may be decoded without clocking out and capturing an entire frame of image data. The partial frame of image data that is clocked out from the image sensor during the partial frame capture operating mode may be, for example, a row of pixels at or near the center of the image sensor or a limited number of lines of image data corresponding to pixel locations of the image sensor, possibly at varying angular orientations. The control circuit may be configured so that if the control circuit cannot decode a 1D symbol during the course of operating in the partial frame capture mode, or detects that a 2D symbol is represented in the captured image data, the control circuit switches operation to a full frame capture mode.

In another embodiment, the partial frame operating mode is employed to clock out and capture pixel values corresponding to a grouping of pixels at or near a center of an image sensor other than a linear pattern of pixels. This embodiment may be advantageously employed in cases where decodable symbols are expected to be concentrated proximate a center of an image sensor's field of view. A control circuit may be configured so that if the control circuit cannot decode a symbol represented in the partial frame, or determines that a symbol is represented partially or entirely outside the image data of the partial frame, the control circuit automatically switches operation to a full frame image capture mode.

The invention is an optical reader having a 2D image sensor that is configured to operate in a partial frame capture mode. In a partial frame operating mode, the reader clocks out and captures at least one partial frame of image data having image data corresponding to less than all of the pixels of an image sensor pixel array. In one embodiment, the reader operating in a partial frame operating mode captures image data corresponding to a linear pattern of pixels of the image sensor, reads the image data, attempts to decode for a decodable 1D symbol which may be represented in the image data, and captures a full frame of image data if the image data reading reveals a 2D symbol is likely to be present in a full field of view of the 2D image sensor.

[End of section excerpted from U.S. patent application Ser. No. 09/766,806].

While the present invention has been explained with reference to the structure disclosed herein, it is not confined to the details set forth and this invention is intended to cover any modifications and changes as may come within the scope of the following claims.

The invention claimed is:

1. An apparatus for use in reading a bar code symbol, wherein the apparatus comprises in combination:
   an imaging assembly;
   a hand graspable housing;
   wherein the imaging assembly comprises an image sensor having a plurality of pixels and optics focusing an image onto the image sensor;
   wherein the apparatus is operable in a plurality of user selectable operating states;
   wherein the apparatus in one of the plurality of user selectable operating states is operable to capture a relatively smaller sized frame of image data and responsively to a processing of the relatively smaller sized frame of image data capture one or more relatively larger sized frames of image data for use in attempting to decode the bar code symbol, the one or more relatively larger sized frames of image data having image data corresponding to a predetermined set of pixels of said image sensor and representing a larger portion of the bar code symbol than image data of the relatively smaller sized frame of image data;
   wherein the apparatus in another one of the plurality of user selectable operating states is operable to capture a first frame of image data having image data corresponding to a first set of pixels of the image sensor and responsively to a processing of the first frame of image data capture a second frame of image data having image data corresponding to a second set of pixels of the image sensor for use in attempting to decode the bar code symbol, wherein the second set of pixels is different from the first set of pixels and wherein the pixels of the second set of pixels are adaptively determined responsively to a processing of the first frame of image data.

2. The apparatus of claim 1, wherein said apparatus in said one of the plurality of operating states is operable to capture said one or more relatively larger sized frames of image data conditionally on the condition that the processing of the relatively smaller sized frame of image data does not result in a successful decoding of the bar code symbol.

3. The apparatus of claim 1, wherein the image sensor is a CMOS image sensor.

4. The apparatus of claim 1, wherein the one or more relatively larger sized frames of image data includes a full frame of image data.

5. The apparatus of claim 1, wherein the apparatus includes an illumination assembly.

6. The apparatus of claim 1, wherein the apparatus includes an illumination assembly, wherein said illumination assembly includes a laser, and wherein said illumination assembly is adapted to project an aiming pattern.

7. The apparatus of claim 1, wherein the apparatus includes an illumination assembly and wherein said illumination assembly includes a white LED.

8. The apparatus of claim 1, wherein the apparatus includes an illumination assembly and wherein said illumination assembly includes a red LED.

9. The apparatus of claim 1, wherein the apparatus is operative to attempt to decode a 1D bar code symbol.

10. The apparatus of claim 1, wherein the apparatus is operative to attempt to decode a 2D bar code symbol.

* * * * *